(12) United States Patent
Shibata et al.

(10) Patent No.: US 7,549,945 B2
(45) Date of Patent: Jun. 23, 2009

(54) CONTROL APPARATUS AND CONTROL METHOD FOR VEHICULAR DRIVE APPARATUS

(75) Inventors: Hiroyuki Shibata, Toyota (JP); Tooru Matsubara, Toyota (JP); Atsushi Tabata, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 249 days.

(21) Appl. No.: 11/733,384

(22) Filed: Apr. 10, 2007

(65) Prior Publication Data

US 2007/0254764 A1 Nov. 1, 2007

(30) Foreign Application Priority Data

Apr. 26, 2006 (JP) ............... 2006-122618

(51) Int. Cl.
*B60W 10/08* (2006.01)
(52) U.S. Cl. .............. 477/5; 477/3; 477/4; 475/5; 180/65.2; 180/65.7
(58) Field of Classification Search .......... 477/3, 477/4, 5, 6; 475/5; 180/65.2, 65.4, 65.7; 701/22
See application file for complete search history.

(56) References Cited

U.S. PATENT DOCUMENTS 7,056,260 B2 * 6/2006 Nakamori et al. ............ 477/3
7,164,247 B2 * 1/2007 Joe et al. ................. 318/432
7,226,385 B2 * 6/2007 Tabata et al. ................ 477/5

FOREIGN PATENT DOCUMENTS

| DE | 19720716 A1 | 1/1998 |
| DE | 102005025654 A1 | 3/2006 |
| JP | 10-000951 A | 1/1998 |
| JP | 10-023607 A | 1/1998 |
| JP | 2000-318492 A | 11/2000 |
| JP | 2002-340167 A | 11/2002 |
| JP | 2005-331063 A | 12/2005 |
| JP | 2005-351459 A | 12/2005 |
| JP | 2006-017282 A | 1/2006 |

OTHER PUBLICATIONS

German Office Action dated Feb. 5, 2009, and English translation.

* cited by examiner

*Primary Examiner*—David D. Le
(74) *Attorney, Agent, or Firm*—Sughrue Mion, PLLC

(57) ABSTRACT

A torque control selection portion selects one of a first torque control portion and a second torque control portion as a control portion that controls a torque output from an automatic transmission, based on a vehicle condition. The first torque control portion controls the output torque by controlling an engagement pressure for a first clutch or a second clutch. The second torque control portion controls the output torque by controlling a reaction torque borne by a first motor when transmission of power is permitted in a shift mechanism.

3 Claims, 19 Drawing Sheets

FIG. 2

| | C1 | C2 | B1 | B2 | B3 | SPEED RATIO | STEP |
|---|---|---|---|---|---|---|---|
| 1st | ○ | | | | ○ | 3.357 | |
| 2nd | ○ | | | ○ | | 2.180 | 1.54 |
| 3rd | ○ | | ○ | | | 1.424 | 1.53 |
| 4th | ○ | ○ | | | | 1.000 | 1.42 |
| 5th | ○ | ○ | | | | 0.705 | 1.42 |
| R | | ○ | | | ○ | 3.209 | TOTAL 4.76 |
| N | | | | | | | |

○ CIRCLE: ENGAGED

F I G . 12
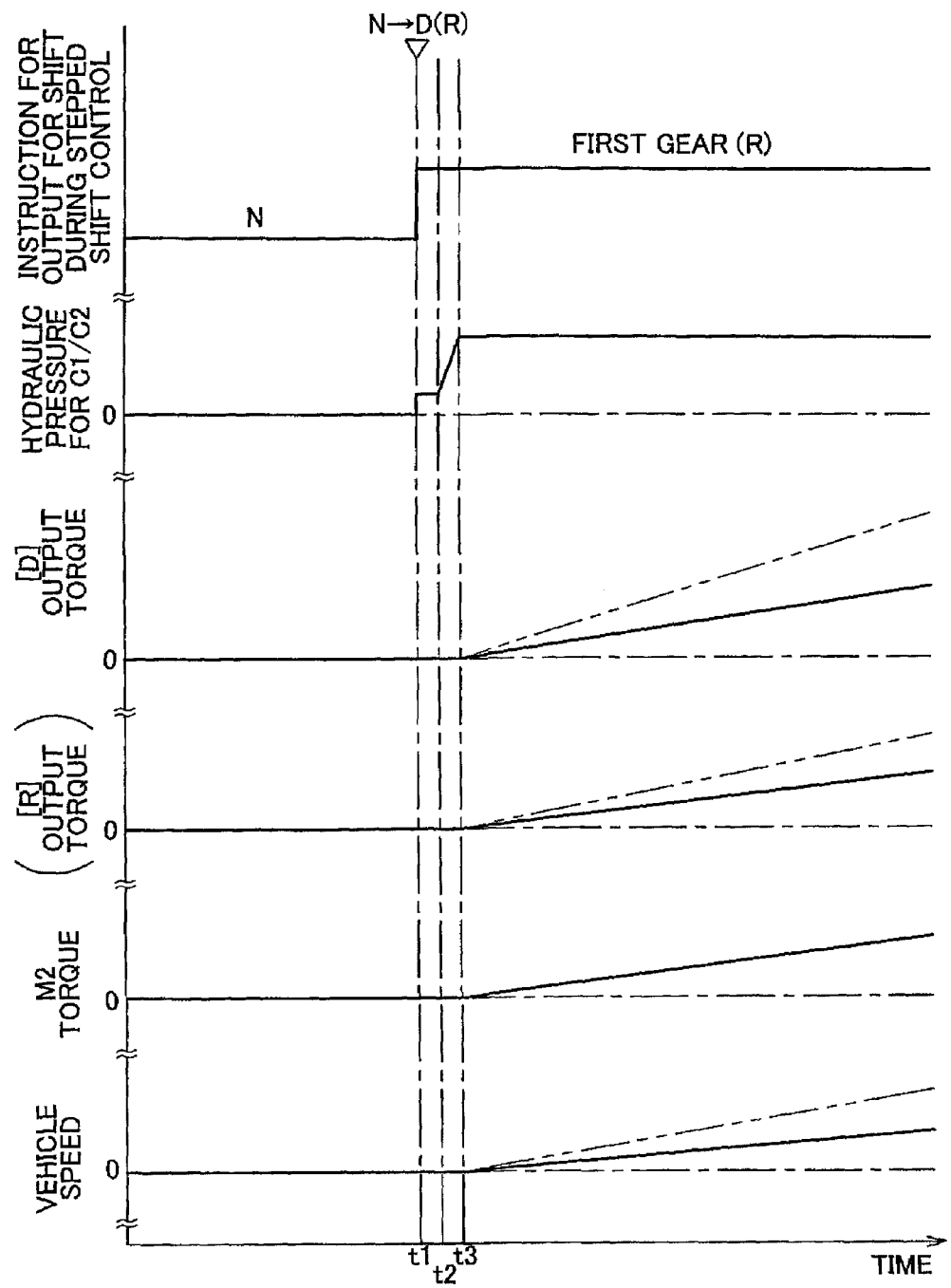

FIG. 19

| | C1 | C2 | B1 | B2 | SPEED RATIO | STEP |
|---|---|---|---|---|---|---|
| 1st | ○ | | | ○ | 2.804 | |
| 2nd | ○ | | ○ | | 1.531 | 1.83 |
| 3rd | ○ | ○ | | | 1.000 | 1.53 |
| 4th | ○ | ○ | | | 0.705 | 1.42 |
| R | | ○ | | ○ | 2.393 | TOTAL 3.977 |
| N | | | | | | |

○ CIRCLE: ENGAGED

CONTROL APPARATUS AND CONTROL METHOD FOR VEHICULAR DRIVE APPARATUS

INCORPORATION BY REFERENCE

The disclosure of Japanese Patent Application No. 2006-122618 filed on Apr. 26, 2006, including the specification, drawings and abstract is incorporated herein by reference in its entirety.

BACKGROUND OF THE INVENTION

1. Field of the Invention

The invention relates to a control apparatus and a control method for a vehicular drive apparatus that includes an electric differential portion that includes a differential mechanism that can perform a differential action, a power transmission portion provided in a power transmission path from the differential portion to a driving wheel, and an engagement device that can switch the state of the power transmission path between a power-transmission permitted state and a power-transmission interrupted state. When the power transmission path is in the power-transmission permitted state, the transmission of power is permitted. When the power transmission path is in the power-transmission interrupted state, the transmission of power is interrupted. More particularly, the invention relates to a technology that controls a torque output from the power transmission portion.

2. Description of the Related Art

A control apparatus for a vehicular drive apparatus is available. The vehicular drive includes a differential portion that includes a differential mechanism that distributes an output from an engine to a first motor and a transmitting member, a power transmission portion provided in a power transmission path from the differential portion to a driving wheel, and an engagement device that can switch the state of the power transmission path between a power-transmission permitted state and a power-transmission interrupted state. The control apparatus controls a torque output from the power transmission portion to the driving wheels.

Japanese Patent Application Publication No. 2005-351459 (JP-A-2005-351459) describes an example of such a control apparatus for a vehicular drive apparatus. The vehicular drive apparatus includes a differential portion, a power transmission portion, and a hydraulic frictional engagement device. The differential portion includes a differential mechanism that includes a planetary gear unit, and a second motor that is operatively connected to a transmitting member. The power transmission portion includes a stepped automatic transmission. The hydraulic frictional engagement device selectively switches the state of a power transmission path from the differential portion to the power transmission portion, between a power-transmission permitted state and a power-transmission interrupted state. When the power transmission path is in the power-transmission interrupted state, the control apparatus executes a synchronization control using the first motor and/or the second motor so that the rotational speed of the transmitting member, which is the output member of the differential portion, is equal to a value that is determined based on a vehicle speed and the speed ratio of the automatic transmission. Therefore, even when the engagement device is quickly engaged to switch the state of the power transmission path from the power-transmission interrupted state to the power-transmission permitted state, an engagement shock is suppressed.

However, for example, when the vehicle is in the condition that the synchronization control cannot be executed using the first motor and/or the second motor, the torque output from the power transmission portion cannot be sufficiently controlled. This may increase an engagement shock.

For example, when the vehicle is in the condition that the synchronization control for the rotational speed of the transmitting member cannot be sufficiently executed using the first motor and/or the second motor due to a decrease in the state of charge (SOC) of a battery, the difference in the rotational speed between members to be connected by the engagement device is not reduced. Therefore, when the engagement device is quickly engaged to switch the state of the power transmission path from the power-transmission interrupted state to the power-transmission permitted state, an engagement shock may be increased.

In contrast, even if the synchronization control that reduces the difference in the rotational speed between the members to be connected by the engagement device is not executed, the torque output from the power transmission portion may be controlled using an engagement pressure control that gradually increases an engagement pressure to suppress a shock when the engagement device is engaged. However, for example, when the vehicle is in the condition that the temperature of hydraulic fluid used to operate the engagement device is extremely low, it may be difficult to accurately execute the engagement pressure control due to the high viscosity of the hydraulic fluid. This may increase a shock.

SUMMARY OF THE INVENTION

A first aspect of the invention relates to a control apparatus for a vehicular drive apparatus that includes a differential portion that includes a differential mechanism that distributes an output from an engine to a first motor and a transmitting member; a power transmission portion that is provided in a power transmission path from the differential portion to a driving wheel; and an engagement device that can switch the state of the power transmission path between a power-transmission permitted state and a power-transmission interrupted state. When the power transmission path is in the power-transmission permitted state, transmission of power is permitted in the power transmission path. When the power transmission path is in the power-transmission interrupted state, the transmission of power is interrupted in the power transmission path. The control apparatus includes a first torque control portion that controls a torque output from the power transmission portion to the driving wheel, by controlling an engagement pressure for the engagement device; a second torque control portion that controls the torque output from the power transmission portion to the driving wheel, by controlling a reaction torque borne by the first motor when the power transmission path is in the power-transmission permitted state; and a torque control selection portion that selects one of the first torque control portion and the second torque control portion as a control portion that controls the torque output from the power transmission portion, based on a vehicle condition.

In the above-described aspect, the torque control selection portion selects one of the first torque control portion and the second torque control portion as the control portion that controls the torque output from the power transmission portion, based on the vehicle condition. The first torque control portion controls the torque output from the power transmission portion to the driving wheel, by controlling the engagement pressure for the engagement device. The second torque control portion controls the torque output from the power transmission portion to the driving wheel, by controlling the reaction torque borne by the first motor when the power transmission path is in the power-transmission permitted state. Therefore, the torque output from the power transmission portion is appropriately controlled, regardless of the vehicle condition.

A second aspect of the invention relates to a control method for a vehicular drive apparatus that includes a differential portion that includes a differential mechanism that distributes an output from an engine to a first motor and a transmitting member; a power transmission portion that is provided in a power transmission path from the differential portion to a driving wheel; and an engagement device that can switch the state of the power transmission path between a power-transmission permitted state and a power-transmission interrupted state. When the power transmission path is in the power-transmission permitted state, transmission of power is permitted in the power transmission path. When the power transmission path is in the power-transmission interrupted state, the transmission of power is interrupted in the power transmission path. The control method includes selecting, based on a vehicle condition, whether to control a torque output from the power transmission portion to a driving wheel, by controlling an engagement pressure for the engagement device, or to control the torque output from the power transmission portion to the driving wheel, by controlling a reaction torque borne by the first motor when the power transmission path is in the power-transmission permitted state.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 2 is an operation table explaining the combinations of operations of hydraulic frictional engagement devices used in the shift operation of the drive apparatus in FIG. 1;

FIG. 12 shows an increase in the output torque at the time of start of a vehicle in the case shown in FIG. 11;

FIG. 19 is an operation table explaining the combinations of operations of hydraulic frictional engagement devices used in the shift operation of the drive apparatus in FIG. 18, FIG. 19 corresponding to FIG. 2.

DETAILED DESCRIPTION OF THE EXAMPLE EMBODIMENTS

Hereinafter, embodiments of the invention will be described in detail with reference to the drawings.

i. First Embodiment

Figure 1:
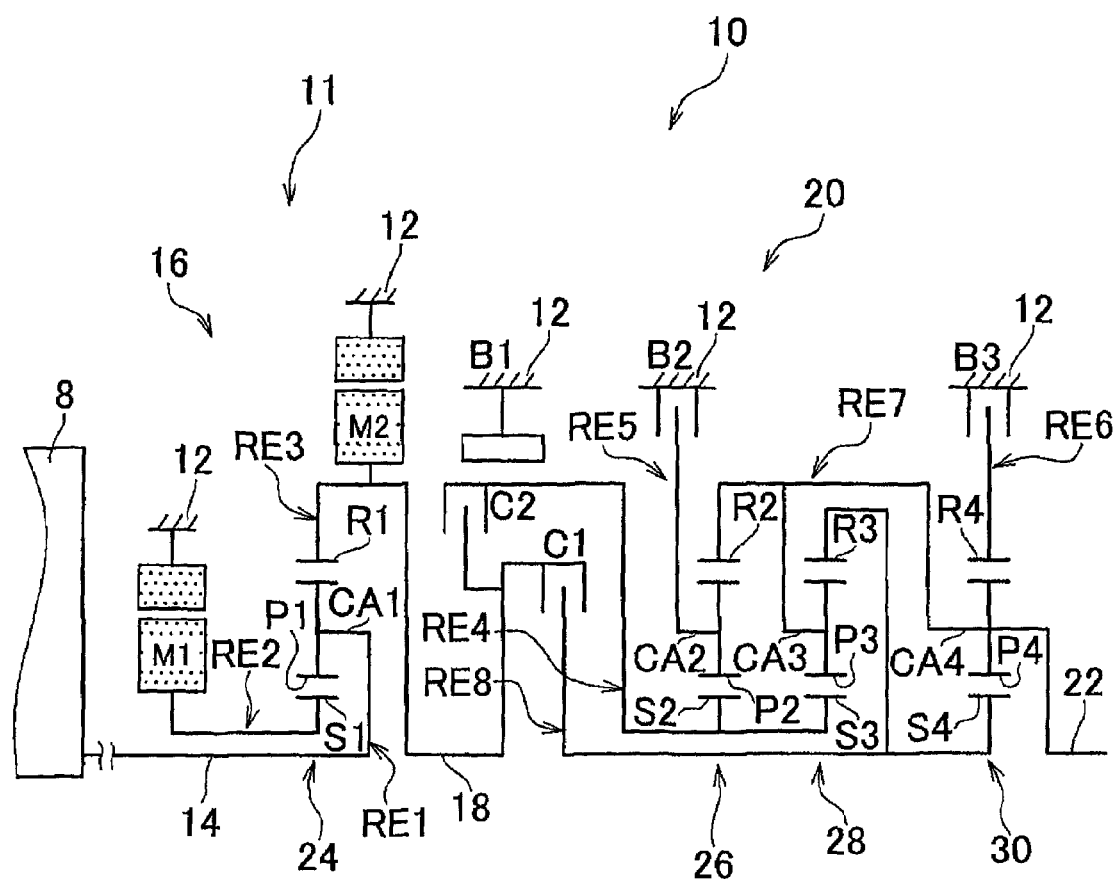
FIG. 1 is a schematic diagram explaining the configuration of a drive apparatus for a hybrid vehicle, according to an embodiment of the invention

FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case (hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or indirectly connected to the input shaft 14 via a pulsation absorption damper (i.e., a vibration-damping device; not shown) or the like. The automatic shift portion 20 is a power transmission portion. The automatic shift portion 20 is provided in a power transmission path between the differential portion 11 and drive wheels 34 (refer to FIG. 7), and directly connected to the differential portion 11 via a transmitting member (transmitting shaft) 18. The output shaft 22, which is an output rotational member, is connected to the automatic shift portion 20. For example, the shift mechanism 10 is provided in a front-engine rear-wheel-drive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 34. The engine 8 is a driving power source for driving the vehicle, which is directly connected to the input shaft 14, or indirectly connected to the input shaft 14 via the pulsation absorption damper (not shown). The shift mechanism 10 transmits power from the engine 8 to the pair of drive wheels 34 via a differential gear unit (final reducer) 32 (refer to FIG. 7), a pair of axles, and the like, which constitute a part of the power transmission path.

Figure 18:
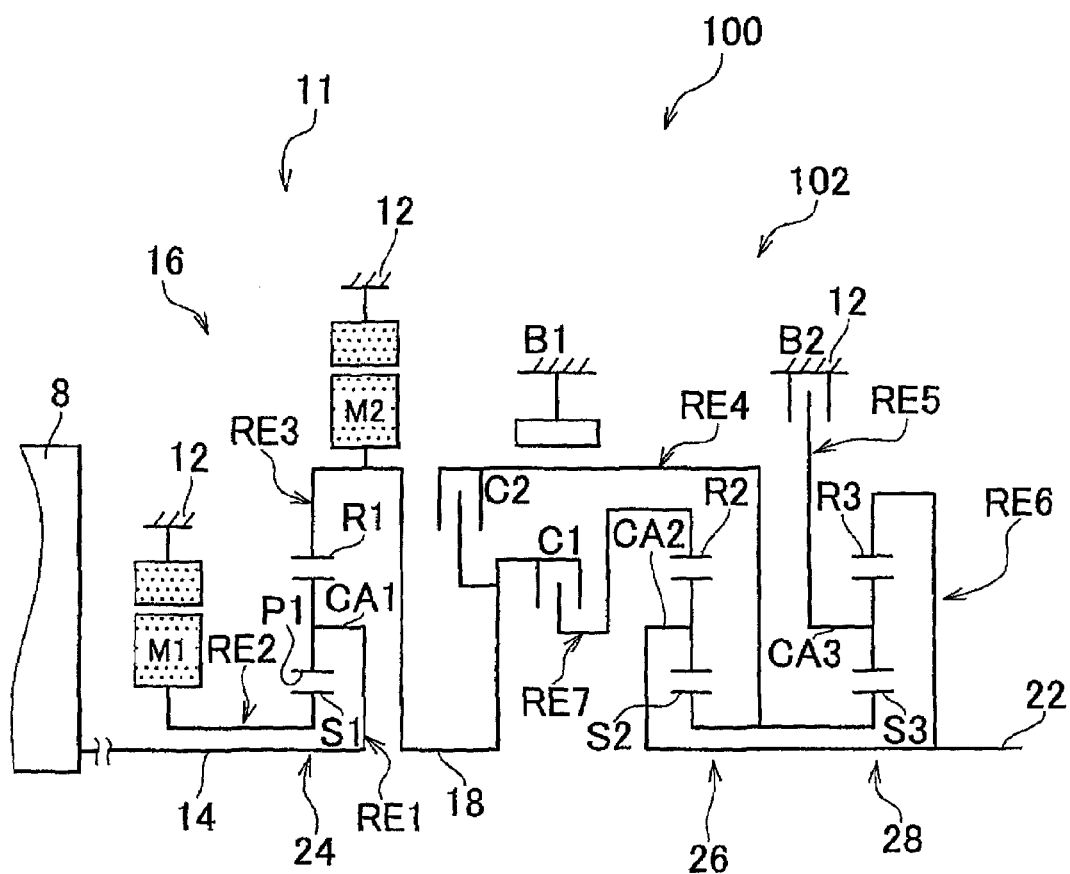
FIG. 18 is a schematic diagram explaining the configuration of a drive apparatus for a hybrid vehicle, according to another embodiment of the invention, FIG. 18 corresponding to FIG. 1.

Thus, the engine 8 is directly connected to the differential portion 11 in the shift mechanism 10 in the embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1. In FIG. 18 that show another embodiment described later, the lower portion of the shift mechanism 100 is similarly omitted.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is operatively connected to the transmitting member 18 so that the second motor M2 is rotated integrally with the transmitting member 18. Each of the first motor M1 and the second motor M2 in the embodiment is a so-called motor-generator that has the function of generating electric power (power-generation function). The first motor M1 has at least the power-generation function for bearing a reaction force. The second motor M2 has at least a motor function for outputting the driving power as the driving power source.

The power split mechanism 16 mainly includes a first planetary gear unit 24. The first planetary gear unit 24 is of a single pinion type, and has a predetermined gear ratio $\beta 1$ of, for example, approximately "0.418". The first planetary gear unit 24 includes a first sun gear S1, a first planetary gear P1, a first carrier CA1, and a first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio $\rho 1$ is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 16 having the above-described configuration is placed in a differential mode in which the differential action can be performed, that is, the differential action is performed. Thus, the output from the engine 8 is distributed to the first motor M1 and the transmitting member 18. Also, electric energy is generated by the first motor M1 using part of the output from the engine 8 that is distributed to the first motor M1, and the generated electric energy is accumulated, or used to rotate the second motor M2. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, when the power split mechanism 16 is placed in the differential mode, the differential portion 11 is also placed in the differential mode. Thus, the differential portion 11 functions as the electric CVT in which a speed ratio $\gamma 0$ (the rotational speed $N_{IN}$ of the input shaft 14/the rotational speed $N_{18}$ of the transmitting member 18) is continuously changed from the minimum value $\gamma 0$ min to the maximum value $\gamma 0$ max.

The automatic shift portion 20 includes a second planetary gear unit 26 of a single pinion type, a third planetary gear unit 28 of a single pinion type, and a fourth planetary gear unit 30 of a single pinion type. The automatic shift portion 20 functions as a stepped automatic transmission. That is, the automatic shift portion 20 is a planetary gear type automatic transmission with a plurality of speeds. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio $\rho 2$ of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio p3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio $\rho 4$ of, for example, approximately "0.421". The gear ratio $\rho 2$ is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the automatic shift portion 20 is selectively connected to the differential portion 11 (the transmitting member 18) via the first clutch C1 or the second clutch C2 that is used to select the gear of the automatic shift portion 20. In other words, each of the first clutch C1 and the second clutch C2 functions as an engagement device that selectively switches the state of the power transmission path between the transmitting member 18 and the automatic shift portion 20, that is, the power transmission path from the differential portion 11 (the transmitting member 18) to the drive wheels 34. The state of the power transmission path is selectively switched between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When a hydraulic frictional engagement device that needs to be disengaged (hereinafter, referred to as "disengagement-side engagement device") is disengaged, and a hydraulic frictional engagement device that needs to be engaged (hereinafter, referred to as "engagement-side engagement device") is engaged in the automatic shift portion 20, a clutch-to-clutch shift is performed. As a result, one of the first gear to the fourth gear, or the reverse gear, or the neutral state is selected. Thus, the speed ratio γ (=the rotational speed $N_{18}$ of the transmitting member 18/the output-shaft rotational speed $N_{OUT}$ of the output shaft 22) at each gear is achieved. The speed ratio γ changes substantially geometrically. As shown in an engagement operation table in FIG. 2, for example, when the shift mechanism 10 functions as the stepped transmission, the first gear, at which a speed ratio γ1 is set to the maximum value, for example, approximately "3.357", is selected by engaging the first clutch C1 and the third brake B3. The second gear, at which a speed ratio γ2 is set to a value smaller than the speed ratio γ1, for example, approximately "2.180", is selected by engaging the first clutch C1 and the second brake B2. The third gear, at which a speed ratio γ3 is set to a value smaller than the speed ratio γ2, for example, approximately "1.424", is selected by engaging the first clutch C1 and the first brake B1. The fourth gear, at which a speed ratio γ4 is set to a value smaller than the speed ratio γ3, for example, approximately "1.000", is selected by engaging the first clutch C1 and the second clutch C2. The "reverse gear", at which a speed ratio γR is set to a value between the speed ratios y1 and y2, for example, approximately "3.209", is selected by engaging the second clutch C2 and the third brake B3. The neutral state "N" is selected by disengaging the first clutch C1, the second clutch C2, the first brake B1, the second brake B2, and the third brake B3. As shown in the engagement operation table in FIG. 2, the clutches C1 and C2 are engaged in the automatic shift portion 20 at the fifth gear as well as at the fourth gear.

The first clutch C1, the second clutch C2, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in conventional automatic transmissions. Each of the clutches C and the brakes B may be a wet multiple disc type clutch and brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof.

In the shift mechanism 10 that has the above-described configuration, the CVT is formed by combining the differential portion 11 that functions as the CVT with the automatic shift portion 20. When the speed ratio of the differential portion 11 is controlled to be constant, the stepped transmission is substantially formed by combining the differential portion 11 with the automatic shift portion 20.

More specifically, when the differential portion 11 functions as the CVT, and the automatic shift portion 20, which is connected to the differential portion 11 in series, functions as the stepped transmission, the rotational speed input to the automatic transmission 20 (hereinafter, referred to as "input rotational speed for the automatic transmission 20") at least one gear M of the automatic shift portion 20, that is, the rotational speed of the transmitting member 18 (hereinafter, referred to as "transmitting-member rotational speed $N_{18}$") is continuously changed. As a result, the speed ratio is continuously changed in a certain range at the at least one gear M. Accordingly, the total speed ratio γT of the shift mechanism 10 (=the rotational speed $N_{IN}$ of the input shaft 14/the rotational speed $N_{OUT}$ of the output shaft 22) is continuously changed. Thus, the CVT is formed in the shift mechanism 10. The total speed ratio γT of the shift mechanism 10 is determined based on the speed ratio γ0 of the differential portion 11 and the speed ratio γ of the automatic shift portion 20.

For example, the transmitting-member rotational speed $N_{18}$ is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire shift mechanism 10 is continuously changed. The ratio of the speed ratio at a gear to a speed ratio at an adjacent higher gear (i.e., step) is shown in the section "STEP" in FIG. 2. As shown in the section "TOTAL" in FIG. 2, the ratio of the speed ratio at first gear to the speed ratio at the fifth gear is 4.76.

When the speed ratio of the differential portion 11 is controlled to be constant, and the clutches C and the brakes B are selectively engaged to select any one of the first gear to the fourth gear, and the reverse gear, the total speed ratio γT of the entire shift mechanism 10 at each gear is achieved. The total speed ratio γT changes substantially geometrically. Accordingly, in the shift mechanism 10, the stepped transmission is substantially formed.

For example, when the speed ratio γ0 of the differential portion 11 is controlled to be fixed to "1", the total speed ratio γT of the shift mechanism 10 at each of the first gear to the fourth gear, and the reverse gear of the automatic shift portion 20 is achieved, as shown in the engagement operation table in FIG. 2. When the speed ratio γ0 of the differential portion 11 is fixed to a value smaller than "1", for example, approximately 0.7, at the fourth gear of the automatic shift portion 20, the total speed ratio γT is set to a value smaller than "1" at the fourth gear, for example, approximately "0.705". That is, the total speed ratio γT at the fifth gear is achieved, as shown in the engagement operation table in FIG. 2.

Figure 3:
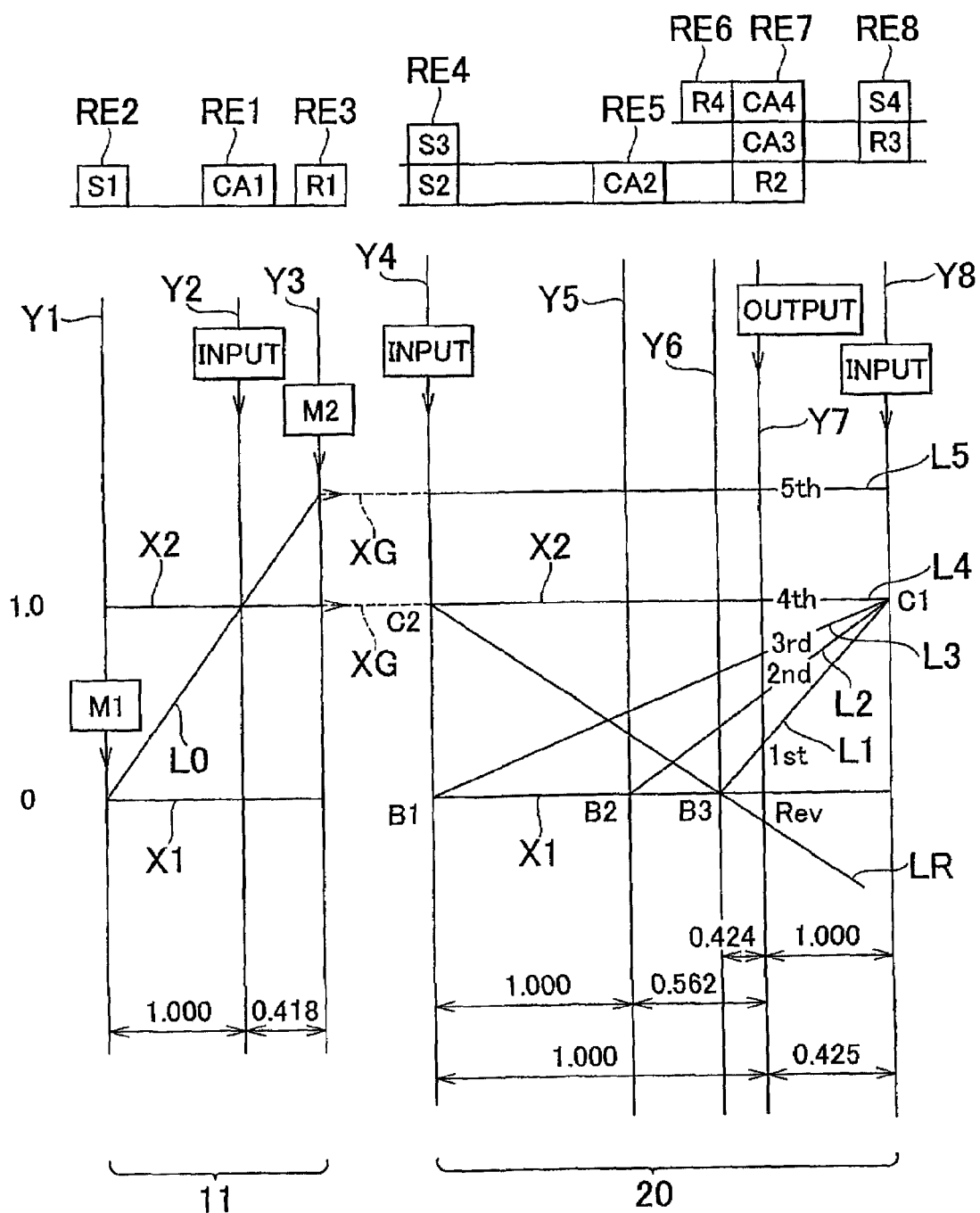
FIG. 3 is a collinear diagram explaining the relative rotational speeds at each gear in the drive apparatus in FIG. 1.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The collinear diagram in FIG. 3 is a two-dimensional coordinate. In the collinear diagram in FIG. 3, the horizontal axis indicates the relation among the gear ratios ρ of the planetary gear units 24, 26, 28, and 30, and the vertical axis indicates relative rotational speeds. The horizontal line X1 among the three horizontal lines indicates the rotational speed of "0". The horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 that constitutes the differential portion 11. That is, the vertical line Y1 indicates the relative rotational speed of the first sun gear S1 that is regarded as a second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as a third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ. That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ.

As shown in the collinear diagram in FIG. 3, in the power splint mechanism 16 (the differential portion 11) in the shift mechanism 10 in the embodiment, the first rotational element RE1 (the first carrier CA1) is connected to the input shaft 14, that is, the engine 8, and the second rotational element RE2 is connected to the first motor M1, and the third rotational element (the first ring gear R1) RE3 is connected to the transmitting member 18 and the second motor M2. Thus, the rotation of the input shaft 14 is transmitted (input) to the automatic shift portion 20 via the transmitting member 18. In this case, the oblique straight line L0 that passes through the intersection of the lines Y2 and X2 indicates the relation between the rotational speed of the first sun gear S1 and the rotational speed of the first ring gear R1.

For example, the differential portion 11 may be placed in the differential mode so that the first rotational element RE1 to the third rotational element RE3 can be rotated relative to each other, and the rotational speed of the first ring gear R1 may be substantially constant. In this case, when the rotational speed of the first sun gear S1 is increased or decreased by controlling the rotational speed of the first motor M1, the rotational speed of the first carrier CA1, that is, the engine speed $N_E$ is increased or decreased. The rotational speed of the first ring gear R1 is indicated by the intersection of the straight line L0 and the vertical line Y3, and depends on a vehicle speed V. The rotational speed of the first sun gear S1 is indicated by the intersection of the straight line L0 and the vertical line Y1. The rotational speed of the first carrier CA1 is indicated by the intersection of the straight line L0 and the vertical line Y2.

When the rotational speed of the first sun gear S1 is made equal to the rotational speed of the engine speed $N_E$ by controlling the rotational speed of the first motor M1 so that the speed ratio γ0 of the differential portion 11 is fixed to "1", the straight line L0 matches the horizontal line X2. Thus, the transmitting member 18 is rotated such that the rotational speed of the first ring gear R1 is equal to the engine speed $N_E$. When the rotational speed of the first sun gear S1 is made 0 by controlling the rotational speed of the first motor M1 so that the speed ratio γ0 of the differential portion 11 is fixed to a value smaller than "1", for example, approximately 0.7, the straight line L0 is set as shown in FIG. 3. Thus, the transmitting member is rotated at the transmitting-member rotational speed $N_{18}$, which is higher than the engine speed $N_E$.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE6 is selectively connected to the transmitting member 18 via the first clutch C1.

When the straight line L0 matches the horizontal line X2 in the differential portion 11, and the rotational speed that is equal to the engine speed $N_E$ is input to the eighth rotational element RE8 from the differential portion 11, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2.

When the straight line L0 is set in the differential portion 11 in FIG. 3, and the rotational speed higher than the engine speed $N_E$ is input to the eighth rotational element RE8 from the differential portion 11, the rotational speed of the output shaft 22 at the fifth gear is indicated by the intersection of the horizontal straight line L5 and the vertical line Y7. The straight line L5 is set by engaging the first clutch C1 and the second clutch C2.

Figure 4:
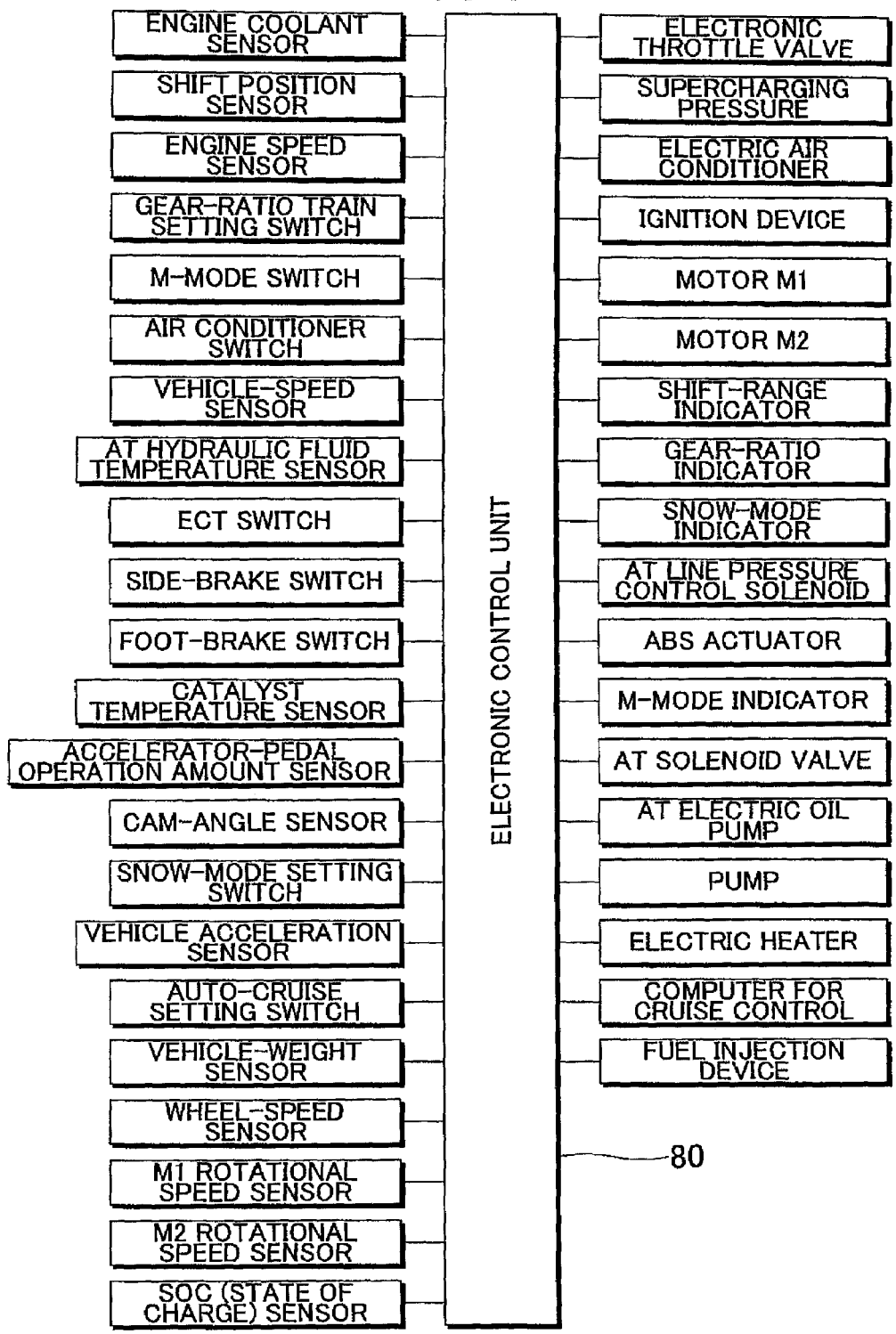
FIG. 4 is a diagram explaining signals input to and output from an electronic control unit provided in the drive apparatus in FIG. 1.

FIG. 4 shows signals that are input to an electronic control unit 80, and signals that are output from the electronic control unit 80 to control the shift mechanism 10 in the embodiment. The electronic control unit 80 includes a so-called microcomputer that includes a CPU, ROM, RAM, and an input/output interface. The electronic control unit 80 executes a hybrid drive control relating to the engine 8, and the first and second motors M1 and M2, and a drive control including a shift control for the automatic shift portion 20, by processing the signals according to programs that are prestored in the ROM, using the temporary storage function of the RAM.

The electronic control unit 80 receives the signals from sensors and switches shown in FIG. 4. That is, the electronic control unit 80 receives a signal indicating an engine coolant temperature $TEMP_W$, a signal indicating a shift position $P_{SH}$ at which a shift lever 52 (refer to FIG. 6) is placed, a signal indicating the number of times that the shift lever 52 is operated at the position "M", a signal indicating the engine speed $N_E$ that is the rotational speed of the engine 8, a signal indicating a gear-ratio train set value, a signal providing an instruction for a manual mode (M-mode), a signal indicating the operation of an air conditioner, a signal indicating the vehicle speed V which depends on the rotational speed $N_{OUT}$ of the output shaft 22, a signal indicating the temperature of hydraulic oil in the automatic shift portion 20, a signal indicating the setting of a power mode (output from an ECT switch), a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which depends on the amount of output required by a driver, a signal indicating a cam angle, a signal indicating the setting of a snow mode, a signal indicating longitudinal acceleration G, a signal indicating an auto-cruise mode, a signal indicating the weight of the vehicle, a signal indicating the wheel speed of each wheel, a signal indicating the rotational speed $N_{M1}$ of the first motor M1 (hereinafter, referred to as "first-motor rotational speed $N_{M1}$"), a signal indicating the rotational speed $N_{M2}$ of the second motor M2 (hereinafter, referred to as "second-motor rotational speed $N_{M2}$", a signal indicating the state of charge SOC in an electric power storage device 56 (refer to FIG. 7), and the like.

The electronic control unit 80 outputs control signals to an engine output control device 58 (refer to FIG. 7) that controls the output from the engine 8. For example, the electronic control unit 80 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 80 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 70 (refer to FIG. 5 and FIG. 7) to control hydraulic actuators for the hydraulic frictional engagement devices in the differential portion 11 and the automatic shift portion 20, a drive instruction signal that operates an electric hydraulic pump for supplying a hydraulic pressure that is used as a basic pressure when a line pressure $P_L$ is regulated using a regulator valve provided in the hydraulic control circuit 70, a signal that drives an electric heater, a signal for a computer used for the cruise control, and the like.

Figure 5:
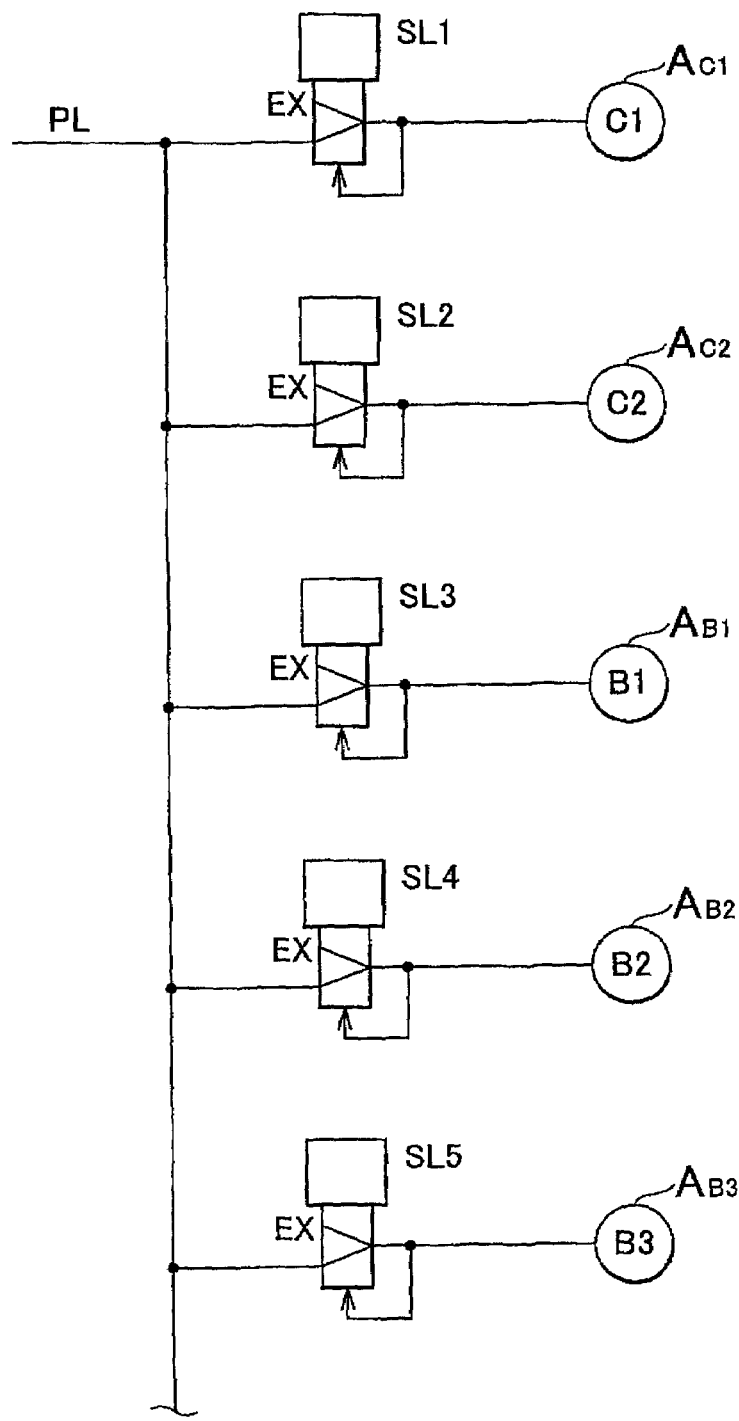
FIG. 5 is a circuit diagram relating to linear solenoid valves that control hydraulic actuators for clutches and brakes, in a hydraulic control circuit.

FIG. 5 is a circuit diagram relating to linear solenoid valves SL1 to SL5 in the hydraulic pressure control circuit 70. The linear solenoid valves SL1 to SL5 controls the operations of hydraulic actuators (hydraulic cylinders) AC1, AC2, AB1, AB2, and AB3 for the clutches C1 and C2, and the brakes B1 to B3, respectively.

In FIG. 5, according to instruction signals from the electronic control unit 80, the linear solenoid valves SL1 to SL5 regulate engagement pressures PC1, PC2, PB1, PB2, and PB3, respectively, using a line pressure PL. Then, the engagement pressures PC1, PC2, PB1, PB2, and PB3 are directly supplied to the actuators AC1 AC2, AB1, AB2, and AB3, respectively. For example, a relief regulator valve regulates the line pressure PL to a value according to an engine load or the like represented by the accelerator-pedal operation amount or a throttle-valve opening amount, using a hydraulic pressure generated by a mechanical oil pump rotated by an electric oil pump (not shown) or the engine 8, as a basic pressure.

The linear solenoid valves SL1 to SL5 basically have the same configuration. The electronic control unit 80 energizes/de-energizes the linear solenoid valves SL1 to SL5, independently. Thus, the hydraulic pressures for the hydraulic actuators AC, AC2, AB1, AB2, and AB3 are regulated independently Accordingly, the engagement pressures PC1, PC2, PB1, PB2, and PB3 for the clutches C1 to C4, and the brakes B1 and B2 are controlled independently. In the automatic shift portion 20, each gear is selected by engaging predetermined engagement devices, for example, as shown in the engagement operation table in FIG. 2. In the shift control for the automatic shift portion 20, for example, engagement and disengagement of the clutch C and the brake B relating to the shift are simultaneously controlled, that is, the so-called clutch-to-clutch shift is performed.

Figure 6:
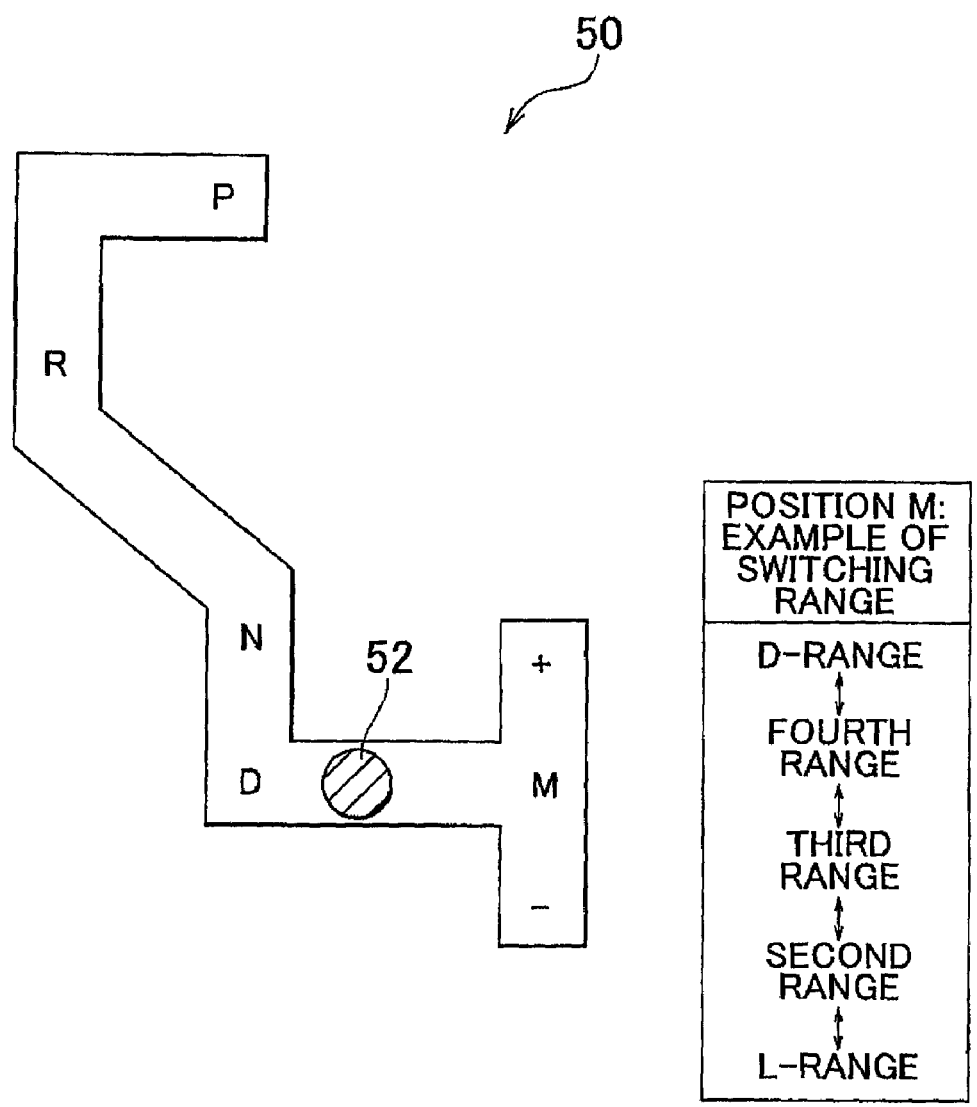
FIG. 6 shows an example of a shift operation device that includes a shift lever, and that is operated to select a shift position among a plurality of positions.

FIG. 6 is an example of a diagram showing a shift operation device 50. The shift operation device 50 is a switching device that switches the shift position $P_{SH}$ among a plurality of positions according to the operation performed by the driver. The shift operation device 50 is provided, for example, on the side of a driver's seat. The shift operation device 50 includes the shift lever 52 that is operated to select the shift position $P_{SH}$ among the plurality of positions.

The shift lever 52 is manually moved to one of a parking position "P (Parking)", a reverse position "R (Reverse)", a neutral position "N (Neutral)", an automatic-shift forward-running position "D (Drive)", and a manual-shift forward-running position "M (Manual)". When the shift lever 52 is at the position "P (Parking)", the transmission of power is interrupted in the power transmission path in the shift mechanism 10, that is, in the automatic shift portion 20 so that the shift mechanism 10 is in the neutral state, and the output shaft of the automatic shift portion 20 is locked. When the shift lever 52 is at the position "R (Reverse)", the vehicle backs up. When the shift lever 52 is at the position "N (Neutral)", the transmission of power is interrupted in the power transmission path in the shift mechanism 10 so that the shift mechanism 10 is placed in the neutral state. When the shift lever 52 is at the position "D (Drive)", an automatic shift mode is selected so that an automatic shift control is executed to select the total speed ratio γT of the shift mechanism 10 in a range in which the total speed ratio γT can be changed. The total speed ratio γT is determined based on the speed ratio of the differential portion 11 and the speed ratio of the automatic shift portion 20 at each gear. The speed ratio of the differential portion 11 is continuously changed in a certain range. The gear of the automatic shift portion 20 is selected among the first gear to the fourth gear by the automatic shift control. When the shift lever 52 is at the position "M (Manual)", a manual shift mode (manual mode) is selected to set so-called shift ranges by restricting the use of the high gear(s) of the automatic shift portion 20.

When the shift lever 52 is manually moved to the shift position $P_{SH}$ among the above-described positions, for example, the state of the hydraulic control circuit 70 is electrically switched to select one of the reverse gear "R", the neutral state "N", the gears in the forward gear "D", and the like shown in the engagement operation table in FIG. 2.

Among the positions "P" to "M", each of the positions "P" and "N" is a non-running position that is selected to stop the vehicle from running. When the shift lever 52 is at the position "P" or "N", for example, both of the first clutch C1 and the second clutch C2 are disengaged, as shown in the engagement operation table in FIG. 2. That is, each of the positions "P" and "N" is a non-driven position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a running position that is selected to cause the vehicle to run. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

More specifically, when the shift lever 52 is manually moved from the position "P" or "N" to the position "R", the state of the power transmission path in the automatic shift portion 20 is switched from the power-transmission interrupted state to the power-transmission permitted state by engaging the second clutch C2. When the shift lever 52 is manually moved from the position "N" to the position "D", the state of the power transmission path in the automatic shift portion 20 is switched from the power-transmission interrupted state to the power-transmission permitted state by engaging at least the first clutch C1. When the shift lever 52 is manually moved from the position "R" to the position "P" or "N", the state of the power transmission path in the automatic shift portion 20 is switched from the power-transmission permitted state to the power-transmission interrupted state by disengaging the second clutch C2. When the shift lever 52 is manually moved from the position "D" to the position "N", the state of the power transmission path in the automatic shift portion 20 is switched from the power-transmission permitted state to the power-transmission interrupted state by disengaging the first clutch C1 and the second clutch C2.

Figure 7:
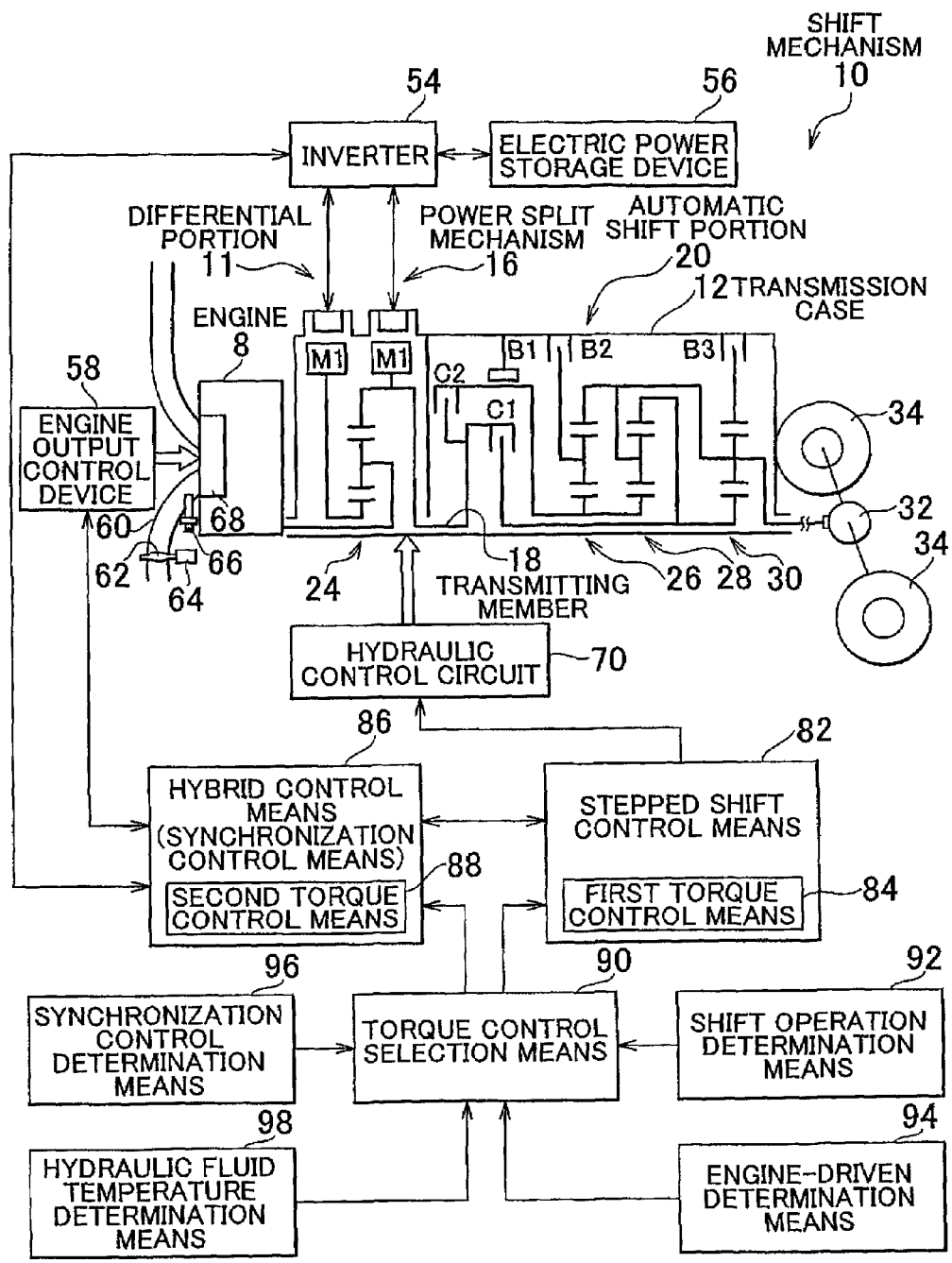
FIG. 7 is a function block diagram explaining the main part of a control operation performed by the electronic control unit in FIG. 4.
Figure 8:
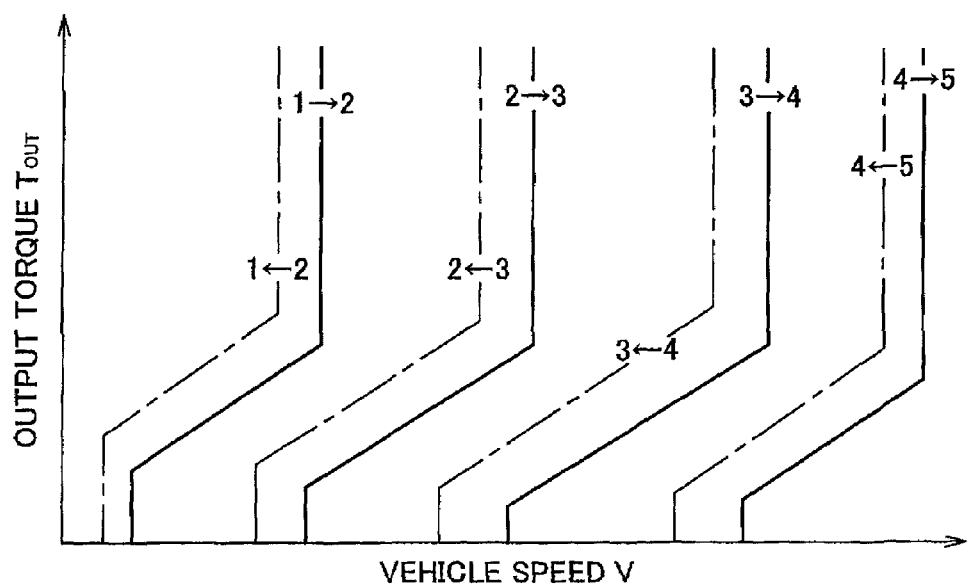
FIG. 8 shows an example of a shift diagram used in a shift control for the drive apparatus.

FIG. 7 is a function block diagram explaining the main part of the control operation performed by the electronic control unit 80. In FIG. 7, stepped shift control means 82 determines whether the automatic shift portion 20 should shift, based on the vehicle condition indicated by the actual vehicle speed V and a required torque $T_{OUT}$ output from the automatic shift portion 20, using a prestored shift diagram (i.e., a shift relation, or a shift map) in which the vehicle speed V and the output torque $T_{OUT}$ are used as parameters, and upshift lines (solid lines) and downshift lines (chain lines) are provided, as shown in FIG. 8. That is, the stepped shift control means 82 determines the gear to which the automatic shift portion 20 should shift, based on the vehicle condition, using the shift diagram. Then, the stepped shift control means 82 executes an automatic shift control so that the automatic shift portion 20 shifts to the determined gear.

At this time, the stepped shift control means 82 provides the instruction (i.e., an instruction for output for shift, or a hydraulic pressure instruction) to the hydraulic control circuit 70 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control means 82 outputs the instruction to the hydraulic control circuit 70 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 70 operates the hydraulic actuators for the hydraulic frictional engagement devices relating to the shift by operating the linear solenoid valves SL in the hydraulic control circuit 70. Thus, the disengagement-side engagement device relating to the shift is disengaged, and the engagement-side engagement device relating to the shift is engaged so that the automatic shift portion 20 shifts to the determined gear.

Hybrid control means 86 operates the engine 8 efficiently, and controls the speed ratio γ0 of the differential portion 11 that functions as the electric CVT, by optimizing the ratio between the driving power provided by the engine 8 and the driving power provided by the second motor M2, and optimizing the reaction force borne by the first motor M1 while the first motor M1 generates electric power. For example, the hybrid control means 86 calculates a target (required) output for driving the vehicle based on the accelerator-pedal operation amount Acc, which indicates the amount of output required by the driver, and the vehicle speed V; calculates a total target output based on the target output for driving the vehicle and a required output for charging the electric power storage device 56; calculates a target engine output so that the total target output can be obtained, taking into account a transfer loss, loads of auxiliary machines, an assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Figure 9:
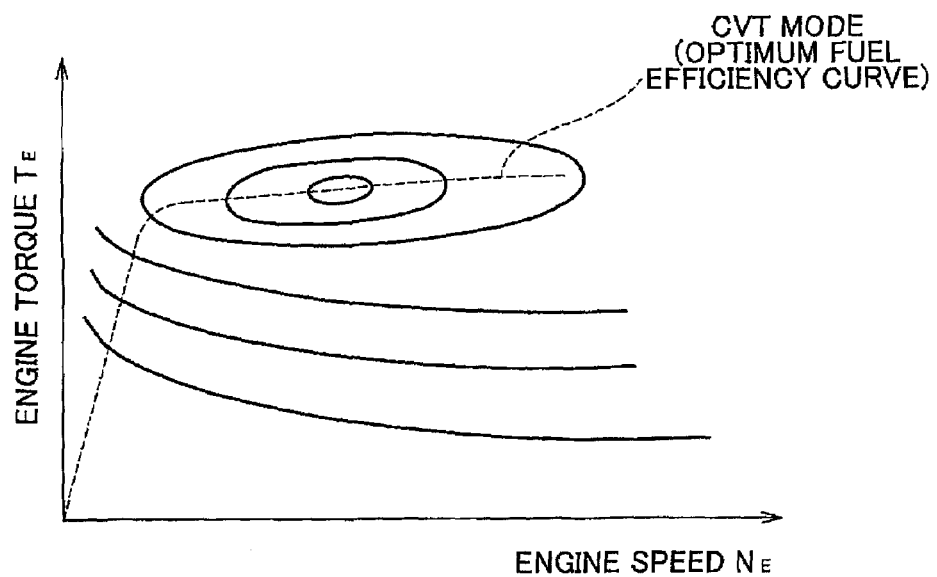
FIG. 9 shows an example of a fuel efficiency map in which a dash line is an optimum fuel efficiency curve.

The hybrid control means 86 executes the hybrid control to improve the power performance, and the fuel efficiency, taking into account the gear of the automatic shift portion 20. During this hybrid control, the differential portion 11 functions as the electric CVT to coordinate the engine speed $N_E$ and the vehicle speed V, which are set to operate the engine 8 efficiently, and the rotational speed of the transmitting member 18, which is set by the gear of the automatic shift portion 20. That is, the hybrid control means 86 sets the target value of the total speed ratio γT of the shift mechanism 10 so that the engine 8 operates according to an optimum fuel efficiency curve (i.e., a fuel efficiency map, a relational diagram) as indicated by the dash line in FIG. 9. The optimum fuel efficiency curve is empirically obtained in advance in a two-dimension coordinate constituted by the engine speed $N_E$ and the torque $T_E$ output from the engine 8 (i.e., engine torque $T_E$) so that high driveability and high fuel efficiency are achieved when the vehicle is driven in the CVT mode. The optimum fuel efficiency curve is stored. For example, the hybrid control means 86 sets the target value of the total speed ratio γT of the shift mechanism 10 to control the engine torque $T_E$ and the engine speed $N_E$ to obtain the engine output that matches the target output (i.e., the total target output, or the required driving power). Then, the hybrid control means 86 controls the speed ratio γ0 of the differential portion 11, taking into the account the gear of the automatic shift portion 20, thereby controlling the total speed ratio γT in a range in which the total speed ratio γT can be changed.

At this time, the hybrid control means 86 supplies the electric energy generated by the first motor M1 to the electric power storage device 56 and the second motor M2 through an inverter 54. Therefore, although the main part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control means 86 can maintain the engine speed $N_E$ at a substantially constant value, or control the engine speed $N_E$ to any given value by using the electric CVT function of the differential portion 11, and by controlling the first-motor rotational speed $N_{M1}$ and/or the second-motor rotational speed $N_{M2}$, regardless of whether the vehicle is stopped or driven. In other words, the hybrid control means 86 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control means 86 increases the first-motor rotational speed $N_{M1}$ while maintaining the second-motor rotational speed $N_{M2}$, which depends on the vehicle speed V (the rotational speed of driving wheels 34), to a substantially constant value. When the engine speed $N_E$ needs to be maintained at a substantially constant value during the shift of the automatic shift portion 20, the hybrid control means 86 increases the first-motor rotational speed $N_{M1}$ if the second-motor rotational speed $N_{M2}$ is decreased by the shift of the automatic shift portion 20, and decreases the first-motor rotational speed $N_{M1}$ if the second-motor rotational speed $N_{M2}$ is increased by the shift of the automatic shift portion 20, while maintaining the engine speed $N_E$ at a substantially constant value.

Also, the hybrid control means 86 functionally includes engine output control means for executing an output control for the engine 8 so that the engine 8 generates the required output, by outputting at least one of the instruction for controlling opening/closing of the electronic throttle valve 62 using the throttle actuator 64, the instruction for controlling the amount of fuel injected by the fuel injection device 66, and the timing at which fuel is injected by the fuel injection device 66, and the instruction for controlling the timing at which the fuel is ignited by the ignition device 68 such as the igniter, to the engine output control device 58.

For example, the hybrid control means 86 basically executes a throttle control to drive the throttle actuator 60 based on the accelerator-pedal operation amount Acc according to a prestored relation (not shown). That is, the hybrid control means 86 basically executes the throttle control to increase the throttle-valve opening amount $\theta_{TH}$ as the accelerator-pedal operation amount Acc increases. The engine output control device 58 controls the engine torque, for example, by controlling the opening/closing of the electronic throttle valve 62 using the throttle actuator 64, controlling the fuel injection performed by the fuel injection device 66, and controlling the timing at which the fuel is ignited by the ignition device 68 such as the igniter, according to the instruction provided by the hybrid control means 86.

Also, the hybrid control means 86 can drive the vehicle in a motor-driven mode, using the electric CVT function (differential action) of the differential portion 11, regardless of whether the engine 8 is stopped or idling. For example, the hybrid control means 86 drives the vehicle in the motor-driven mode in a low output torque $T_{OUT}$ region, that is, in a low engine torque $T_E$ region where the engine efficiency is generally lower than that in a high torque region, or in a low vehicle speed region where the vehicle speed V is low, that is, a low load region. When the vehicle is driven in the motor-driven mode, the hybrid control means 86 executes the control to suppress the drag of the engine 8 that is stopped, and to improve fuel efficiency. That is, when the vehicle is driven in the motor-driven mode, the hybrid control means 86 controls the first motor M1 so that the first-motor rotational speed $N_{M1}$ is a negative value, for example, the first motor M1 is idling, using the electric CVT function (differential action) of the differential portion 11, thereby maintaining the engine speed $N_E$ at zero or substantially zero using the differential action of the differential portion 11, as required.

Even when the vehicle is driven in the engine-driven mode, the hybrid control means 86 can perform a so-called torque-assist operation to assist the engine 8, by supplying the electric energy to the second motor M2 from the first motor M1 via the electric path, and/or from the electric power storage device 56, and by driving the second motor M2 to apply torque to the driving wheels 34.

Also, the hybrid control means 86 places the first motor M1 in a no-load state, by interrupting the flow of driving electric current that is supplied to the first motor M1 from the electric power storage device 56 via the inverter 58. When the first motor M1 is placed in the no-load state, the first motor M1 is permitted to idle, and torque cannot be transmitted in the differential portion 11. That is, the transmission of power is substantially interrupted in the power transmission path in the differential portion 11, and no output is generated from the differential portion 11. That is, the hybrid control means 86 places the differential portion 11 in the neutral state so that the transmission of power is electrically interrupted in the power transmission path in the differential portion 11, by placing the first motor M1 in the no-load state.

When the shift lever 52 of the shift operation device 50 is moved from the position "N" ("P") to the position "D" ("R"), that is, the shift position $P_{SH}$ is switched from the position "N" ("P") to the position "D" ("R"), and accordingly the state of the power transmission path in the shift mechanism 10 is switched from the power-transmission interrupted state to the power-transmission permitted state, the hybrid control means 86 minimizes the difference in the rotational speed between the members to be connected by the clutch C1 or the clutch C2 that should be engaged by the stepped shift control means 82, to suppress an engagement shock. The hybrid control means 86 minimizes the difference in the rotational speed between the members by using the differential action of the differential portion 11, and by using the first motor M1 and/or the second motor M2. That is, the hybrid control means 86 functions as the synchronization control means for controlling the transmitting-member rotational speed $N_{18}$ toward the input rotational speed for the automatic shift portion 20 (=the output-shaft rotational speed $N_{OUT}$×the speed ratio γ of the automatic shift portion 20), which depends on the vehicle speed V For example, when the first clutch C1 or the second clutch C2 is engaged by the stepped shift control means 82 according to the movement of the shift lever 52 from the position N (P) to the position D (R) while the vehicle is in the engine-driven mode, the hybrid control means 86 places the first motor M1 in the no-load state, and controls the second-motor rotational speed $N_{M2}$ (i.e., the transmitting-member rotational speed $N_{18}$) toward the input rotational speed for the automatic shift portion 20, which depends on the vehicle speed V (the input rotational speed for the automatic shift portion 20 is zero when the vehicle is stopped).

The stepped shift control means 82 includes first torque control means 84 for controlling the torque $T_{OUT}$ output from the automatic shift portion 20 to the driving wheels 34, by controlling the engagement pressure for the first clutch C1 or the second clutch C2.

For example, when the state of the power transmission path in the shift mechanism 10 is switched to the power-transmission permitted state according to the movement of the shift lever 52 from the position "N" ("P") to the position "D" ("R") while the vehicle is in the engine-driven mode, the first torque control means 84 outputs an instruction for gradually increasing the engagement pressure for the first clutch C1 or the second clutch C2 that should be engaged, instead of quickly applying the engagement pressure to the first clutch C1 or the second clutch C2, to the hydraulic control circuit 70 so that the torque $T_{OUT}$ output from the automatic shift portion 20 is gradually increased, and a shock is suppressed. According to the instruction, the hydraulic control circuit 70 operates the linear solenoid valve SL to gradually increase the engagement pressure for the first clutch C1 or the second clutch C2 that should be engaged. Thus, an engagement shock is suppressed even when the hybrid control means 86 has not reduced the difference in the rotational speed between the members to be connected by the first clutch C1 or the second clutch C2 that should be engaged.

For example, when the state of the power transmission path in the shift mechanism 10 is switched from the power-transmission permitted state to the power-transmission interrupted state according to the movement of the shift lever 52 of the shift operation device 50 from the position "D" ("R") to the position "N" ("P") while the vehicle is in the engine-driven mode, the first torque control means 84 outputs an instruction for gradually decreasing the engagement pressure for the first clutch C1 or the second clutch C2 that should be disengaged, instead of quickly draining the engagement pressure from the first clutch C1 or the second clutch C2, to the hydraulic control circuit 70 so that the torque $T_{OUT}$ output from the automatic shift portion 20 is gradually decreased, and a shock is suppressed.

The hybrid control means 86 includes second torque control means 88 for controlling the torque $T_{OUT}$ output from the automatic shift portion 20 by controlling a reaction torque borne by the first motor M1 when the at least one of the first clutch C1 and the second clutch C2 is engaged, and accordingly the power transmission path is in the power-transmission permitted state.

For example, the state of the power transmission path in the shift mechanism 10 may be switched to the power-transmission permitted state according to the movement of the shift lever 52 from the position "N" ("P") to the position "D" ("R") while the vehicle is in the engine-driven mode. In this case, when the hybrid control means 86 has reduced the difference in the rotational speed between the members to be connected by the first clutch C1 or the second clutch C2, the stepped shift control means 82 engages the first clutch C1 or the second clutch C2 to switch the state of the power transmission path to the power-transmission permitted state. Then, the second torque control means 88 gradually increases the reaction torque borne by the first motor M1 so that the torque $T_{OUT}$ output from the automatic shift portion 20 is gradually increased, and a shock is suppressed.

Also, the state of the power transmission path in the shift mechanism 10 may be switched from the power-transmission permitted state to the power-transmission interrupted state according to the movement of the shift lever 52 of the shift operation device 50 from the position "D" ("R") to the position "N" ("P") while the vehicle is in the engine-driven mode. In this case, while the torque is transmitted via the first clutch C1 or the second clutch C2 that should be disengaged by the stepped shift control means 82, that is, while the power transmission path in the shift mechanism 10 is maintained in the power-transmission permitted state, the second torque control means 88 gradually decreases the reaction torque borne by the first motor M1 so that the torque $T_{OUT}$ output from the automatic shift portion 20 is gradually decreased, and a shock is suppressed.

When the vehicle is in the condition that the temperature $T_{OIL}$ of the hydraulic fluid for the automatic shift portion 20 is extremely low, the viscosity of the hydraulic fluid (AT fluid) is high. Therefore, it may be difficult for the first torque control means 84 to control the engagement pressure for the first clutch C1 or the second clutch C2. As a result, the torque $T_{OUT}$ output from the automatic shift portion 20 may not be appropriately controlled, and a shock may be increased.

When the vehicle is in the condition that there is a decrease in the function of at least one of the electric devices that are controlled to operate the differential portion 11 as the electric CVT, such as the motor, the hybrid control means 86 may not sufficiently reduce the difference in the rotational speed between the members to be connected by the first clutch C1 or the second clutch C2 that should be engaged, using the first motor M1 and/or the second motor M2. Also, it may be difficult for the second torque control means 88 to control the reaction torque borne by the first motor M1. Accordingly, the torque $T_{OUT}$ output from the automatic shift portion 20 may not be appropriately controlled, and a shock may be increased.

Thus, torque control selection means 90 selects the first torque control means 84 or the second torque control means 88, as the control means for controlling the torque $T_{OUT}$ output from the automatic shift portion 20, based on the vehicle condition. Unless the shift lever 52 is moved from the position N (P) to the position D (R) or from the position D (R) to the position N (P), the torque $T_{OUT}$ output from the automatic shift portion 20 does not need to be controlled by the first torque control means 84 or the second torque control means 88. Therefore, the torque control selection means 90 does not select the control means. Also, when the engine 8 is stopped and the vehicle is stopped, the members to be connected by the first clutch C1 or the second clutch C2 that should be engaged are in a synchronized state, and no torque is generated by the engine 8 and no torque needs to be transmitted from the engine 8 to the driving wheels 34. Therefore, in this case as well, the torque control selection means 90 does not select the control means.

More specifically, shift operation determination means 92 determines whether the shift lever 52 is moved from the position N (P) to the position D (R), or from the position D (R) to the position N (P), based on the shift position $P_{SH}$.

Engine-driven determination means 94 determines whether the engine 8 is operating, that is, the vehicle is in the engine-driven mode, based on the instruction (for example, the signal indicating the amount of fuel to be supplied) output from the hybrid control means 86 to the engine output control device 58.

Synchronization control determination means 96 determines whether the hybrid control means 86 can execute the synchronization control that minimizes the difference in the rotational speed between the members to be connected by the first clutch C1 or the second clutch C2, when the first clutch C1 or the second clutch C2 is engaged by the shift control means 82 according to the movement of the shift lever 52 from the position N (P) to the position D (R). The synchronization control determination means 96 determines whether the hybrid control means 86 can execute the synchronization control, for example, based on whether there is a decrease in the function of at least one of the electric devices relating to the operation of the first motor M1 and/or the second motor M2 that is performed so that the hybrid control means 86 can execute the synchronization control. That is, the synchronization control determination means 96 determines whether the hybrid control means 86 can execute the synchronization control, for example, based on whether there is a failure in at least one of the first motor M1, the second motor M2, the inverter 54, the electric power storage device 56, and the transmission path connecting the devices, or there is a decrease in the function of the at least one electric device due to a low temperature, a decrease in the state of charge (SOC) of the electric power storage device 56, or the like.

Hydraulic fluid temperature determination means 98 determines whether the hydraulic fluid temperature $T_{OIL}$ is higher than a predetermined temperature Temp1. The predetermined temperature Temp1 is a value that is used to determine whether the hydraulic fluid temperature is so low that it is difficult for the first torque control means 84 to control the engagement pressure for the first clutch C1 or the second clutch C2 due to the high viscosity of the hydraulic fluid. The predetermined temperature Temp1 is empirically obtained and stored in advance. For example, the predetermined temperature Temp1 is set to −20° C.

When the shift operation determination means 92 determines that the shift lever 52 is moved from the position N (P) to the position D (R), or from the position D (R) to the position N (P), and the engine-driven determination means 94 determines that the vehicle is in the engine-driven mode, the torque control selection means 90 selects the first torque control means 84 or the second torque control means 88 to control the output torque $T_{OUT}$, based on the vehicle condition.

When the shift operation determination means 92 determines that the shift lever 52 is moved from the position N (P) to the position D (R), the torque control selection means 90 executes the following control. When the synchronization control determination means 96 determines that the hybrid control means 86 can execute the synchronization control that minimizes the difference in the rotational speed between the members to be connected by the first clutch C1 or the second clutch C2, the torque control selection means 90 selects the second torque control means 88. When the synchronization control determination means 96 determines that the hybrid control means 86 cannot execute the synchronization control, if the stepped shift control means 82 executes a control to quickly apply the engagement pressure to the first clutch C1 or the second clutch C2, a shock may occur or the durability of the engagement device may be decreased. Therefore, the torque control selection means 90 selects the first torque control means 84 to avoid a shock and a decrease in the durability.

When the hydraulic fluid temperature determination means 98 determines that the hydraulic fluid temperature $T_{OIL}$ is higher than the predetermined temperature Temp1, the torque control selection means 90 selects the first torque control means 84. When the hydraulic fluid temperature determination means 98 determines that the hydraulic fluid temperature $T_{OIL}$ is equal to or lower than the predetermined temperature Temp1, it may be difficult for the first torque control means 84 to control the first clutch C1 or the second clutch C2 due to the high viscosity of the hydraulic fluid. Therefore, a shock may be increased. Thus, the torque control selection means 90 selects the second torque control means 88 to suppress a shock.

Figure 10:
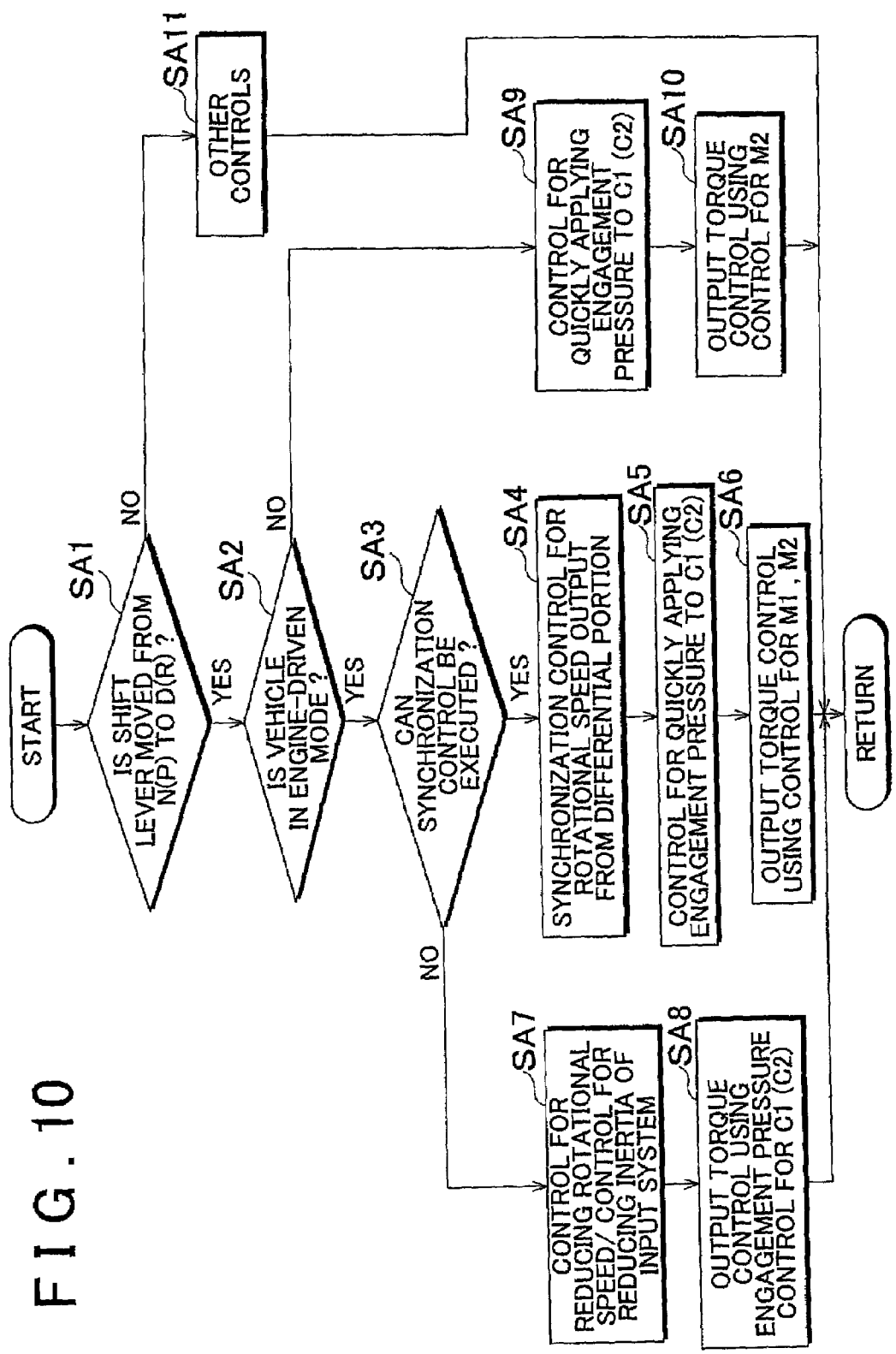
FIG. 10 is a flowchart explaining the control operation performed by the electric control unit in FIG. 4, that is, the control operation for appropriately controlling a torque output from an automatic shift portion when a shift lever is moved from a position N (P) to a position D (R)

FIG. 10 is a flowchart explaining the main control operation performed by the electronic control unit 80, that is, the control operation for appropriately controlling the torque $T_{OUT}$ output from the automatic shift portion 20 when the shift lever 52 is moved from the position N (P) to the position D (R). This routine is executed in an extremely short cycle of, for example, several msec to several tens of msec, and the routine is repeatedly executed.

Figure 11:
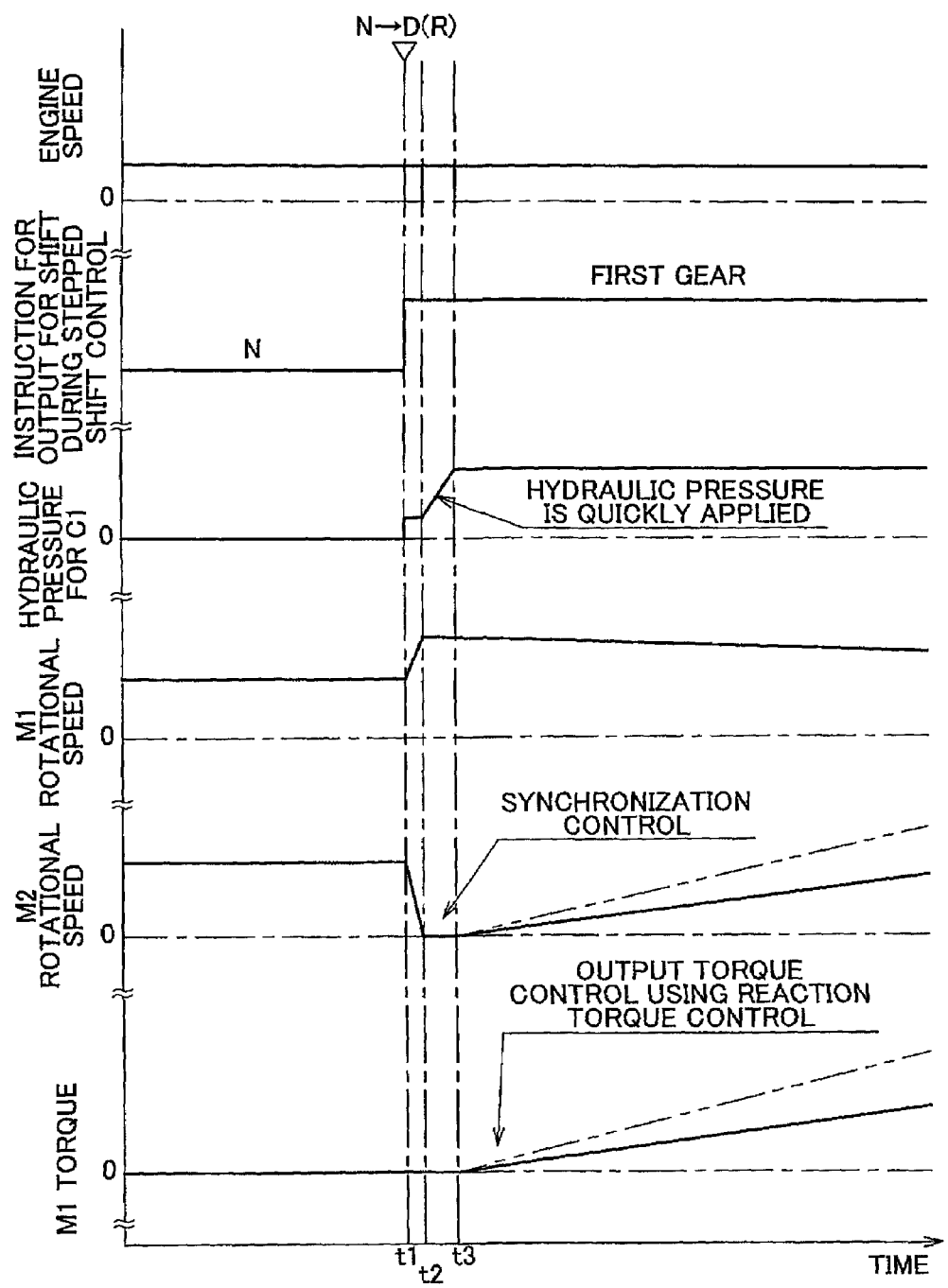
FIG. 11 is a time chart that explains the control operation shown in the flowchart in FIG. 10, and that shows the case where a synchronization control for the engagement device is executed when the shift lever is moved from the position N to the position D (R) while a vehicle is in an engine-driven mode.
Figure 13:
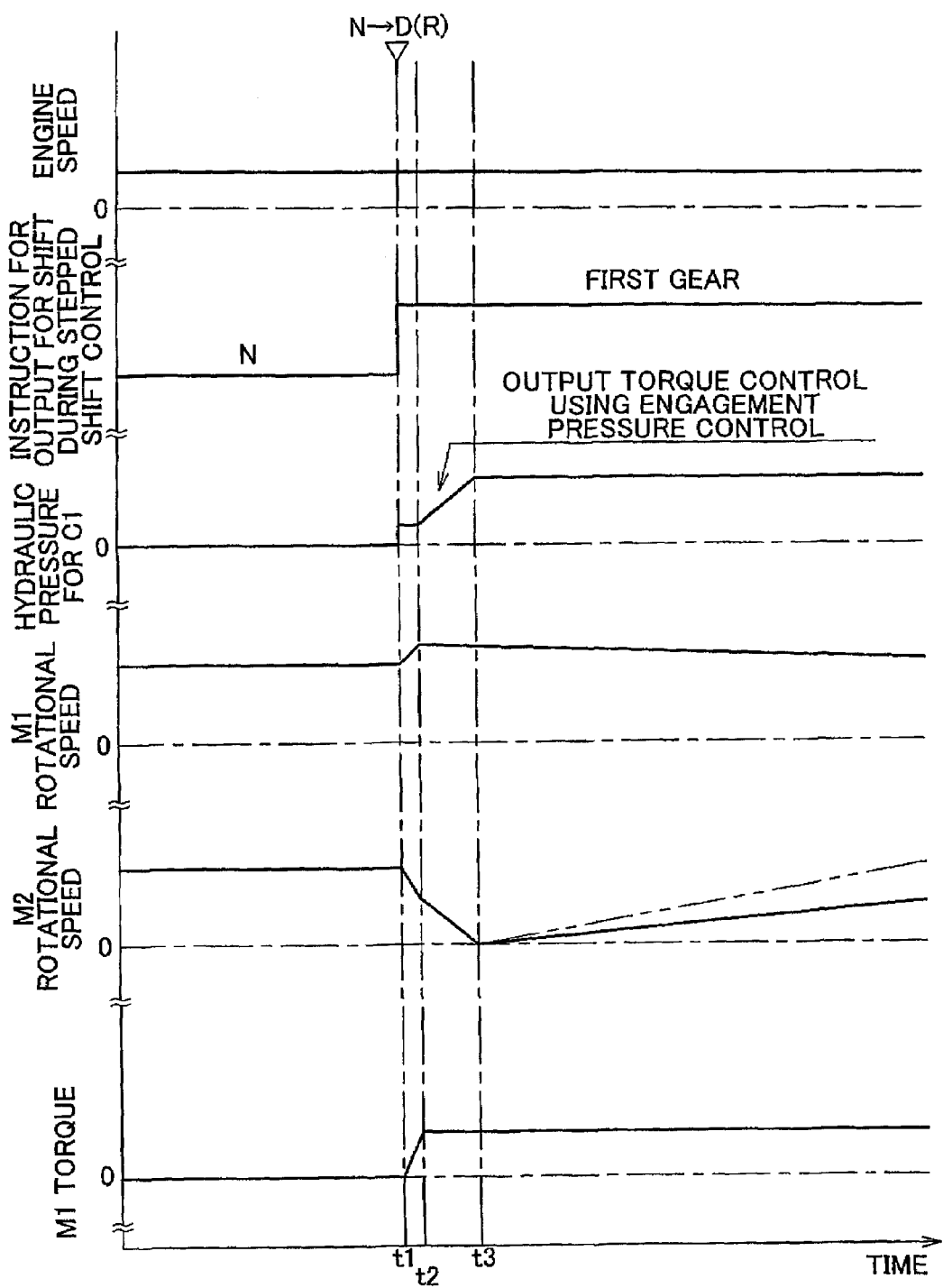
FIG. 13 is a time chart that explains the control operation shown in the flowchart in FIG. 10, and that shows the case where the synchronization control for the engagement device is not executed when the shift lever is moved from the position N to the position D (R) while the vehicle is in the engine-driven mode.
Figure 14:
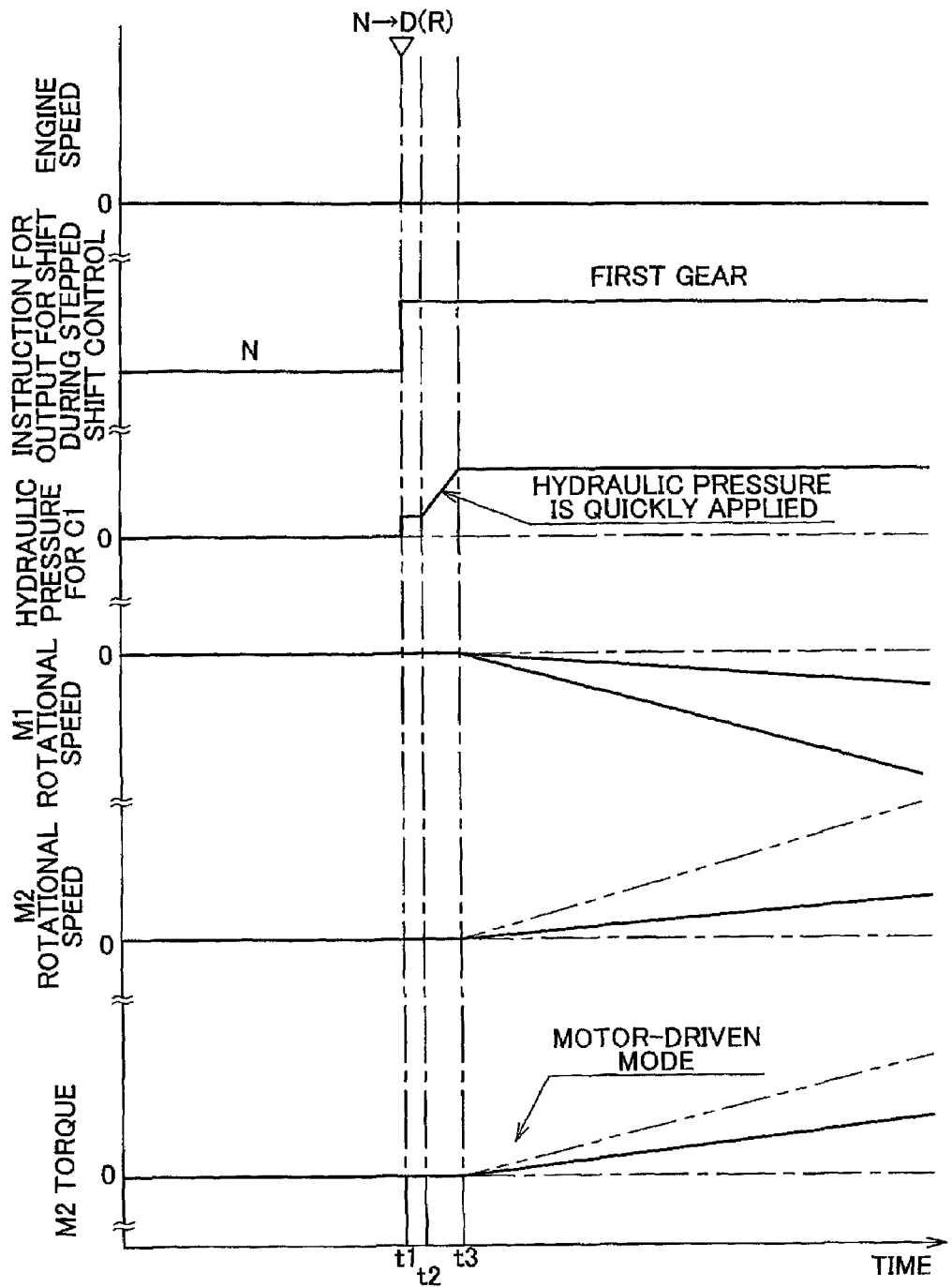
FIG. 14 is a time chart that explains the control operation shown in the flowchart in FIG. 10, and that shows the case where the vehicle is driven in the motor-driven mode when the shift lever is moved from the position N to the position D (R)

FIGS. 11, 12, 13, and 14 are time charts explaining the control operation shown in the flowchart in FIG. 10. FIG. 11 shows the case where the synchronization control for the engagement device is executed when the shift lever 52 is moved from the position N to the position D (R) while the vehicle is in the engine-driven mode. FIG. 12 shows an increase in the output torque $T_{OUT}$ at the time of start of the vehicle in the case shown in FIG. 11. FIG. 13 shows the case where the synchronization control for the engagement device is not executed when the shift lever 52 is moved from the position N to the position D (R) while the vehicle is in the engine-driven mode. FIG. 14 shows the case where the vehicle is in the motor-driven mode when the shift lever 52 is moved from the position N to the position D (R).

In FIG. 10, first, it is determined whether the shift lever 52 is moved from the position N (P) to the position D (R) based on the shift position $P_{SH}$, in step SA1 that corresponds to the shift operation determination means 92.

When a negative determination is made in step SA1, controls other than the control of the torque $T_{OUT}$ output from the automatic shift portion 20 are executed in step SA11, or the routine is finished.

When an affirmative determination is made in step SA1, it is determined whether the engine 8 is operating, that is, the vehicle is in the engine-driven mode, based on the instruction output to the engine output control device 58 (for example, the signal indicating the amount of fuel to be supplied), in step SA2 that corresponds to the engine-driven determination means 94.

When an affirmative determination is made in step SA2, it is determined whether it is possible to execute the synchronization control that minimizes the difference in the rotational speed between the members to be connected by the first clutch C1 or the second clutch C2 that should be engaged according to the movement of the shift lever 52 from the position N (P) to the position D (R), for example, based on whether there is a decrease in the function of at least one of the electric devices due to a decrease in the state of charge (SOC) of the electric power storage device 56 or the like, in step SA3 that corresponds to the synchronization control determination means 96 and the torque control selection means 90.

When it is determined that the synchronization control can be executed, the second torque control means 88 is selected to control the output torque $T_{OUT}$. When it is determined that the synchronization control cannot be executed, if the control is executed to quickly apply the engagement pressure to the first clutch C1 or the second clutch C2 that should be engaged, a problem such as a shock may occur. Therefore, the first torque control means 84 is selected to control the output toque $T_{OUT}$.

When an affirmative determination is made in step SA3, the difference in the rotational speed between the members to be connected by the first clutch C1 or the second clutch C2 that should be engaged is minimized using the differential action of the differential portion 11 and using the first motor M1 and/or the second motor M2, in step SA4 that corresponds to the hybrid control means 86. That is, the transmitting-member rotational speed $N_{18}$ is controlled toward the input rotational speed for the automatic shift portion 20, which depends on the vehicle speed V (the input rotational speed for the automatic shift portion 20 is zero when the vehicle is stopped).

Subsequently, in step SA5 that corresponds to the stepped shift control means 82, the control is executed to quickly apply the engagement pressure to the first clutch C1 or the second clutch C2 that should be engaged when the shift lever 52 is moved from the position N (P) to the position D (R). Thus, the members from the output member of the differential portion 11 to the driving wheels 34 are mechanically connected to each other. That is, the power transmission path in the shift mechanism 10 is placed in the power transmission permitted state.

Further, in step SA6 that corresponds to the second torque control means 88, the reaction torque borne by the first motor M1 is gradually increased so that the torque $T_{OUT}$ output from the automatic shift portion 20 is gradually increased, and a shock is suppressed. That is, in steps SA4 to SA6, after the difference in the rotational speed between the members to be connected by the first clutch C1 or the second clutch C2 that should be engaged is minimized, the engagement pressure is quickly increased. Then, the torque of the first motor M1 is controlled so that the engine torque $T_E$ is gradually transmitted to the first ring gear R1 (transmitting member 18). As a result, the output torque $T_{OUT}$ that is transmitted to the driving wheels 34 is controlled. The torque of the second motor M2 (assist torque) may be gradually increased using the electric power supplied from the first motor M1 through the electric path.

In FIG. 11, before time point $t_1$, the first motor M1 and the second motor M2 are in the no-load state such that the first motor M1 and the second motor M2 are idling while the vehicle is stopped, and the engine 8 is idling. At time point $t_1$, the shift lever 52 is moved from the position N to the position D (R) while the vehicle is stopped, and the engine 8 is idling. During the period from time point $t_1$ to time point $t_2$, the synchronization control is executed to control the second-motor rotational speed $N_{M2}$ (the transmitting-member rotational speed $N_{18}$) toward zero. After time point $t_2$, the members to be connected by the first clutch C1 or the second clutch C2 are in the synchronized state. If the shift lever 52 is moved from the position N to the position D at time point $t_1$, the control is executed to quickly apply the engagement pressure to the first clutch C1 during the period from time point $t_2$ to time point $t_3$. After time point t3, the first ring gear R1 (the transmitting member 18) starts to produce torque when the first motor M1 bears the reaction torque corresponding to the engine torque $T_E$. The sum of the torque produced by the first ring gear R1 (the transmitting member 18) and the assist torque produced by the second motor M2 is ultimately transmitted to the driving wheels 34 via the first clutch C1.

After time point $t_3$ in FIG. 12, the output torque $T_{OUT}$ is gradually increased at the time of start of the vehicle, by controlling the reaction torque borne by the first motor M1 and using the assist torque produced by the second motor M2. As shown in FIG. 12, the characteristic of the increase in the output torque $T_{OUT}$ when the vehicle moves forward (i.e., when the shift lever 52 is moved to the position "D") differs from that when the vehicle backs up (i.e., when the shift lever 52 is moved to the position "R"). For example, when the vehicle moves forward, the torque $T_{OUT}$ is increased more quickly than when the vehicle backs up. For example, in the case indicated by the two dot chain line where the accelerator pedal is quickly depressed, the output torque $T_{OUT}$ is increased quickly, as compared to the case indicated by the solid line.

When a negative determination is made in step SA3, the difference in the rotational speed between the members to be connected by the first clutch C1 or the second clutch C2 that should be engaged is reduced as far as the electric devices can function, in step SA7 that corresponds to the hybrid control means 86, although the complete synchronization control, which is executed in step SA4, is not executed in step SA7. In other words, the rotational speed of an input system that includes the first motor M1, the second motor M2, and the engine 8 is minimized to reduce the inertia of the input system. For example, when the vehicle is stopped, the transmitting-member rotational speed $N_{18}$ is controlled toward zero according to the movement of the shift lever 52 from the position N (P) to the position D (R). Therefore, the second-motor rotational speed $N_{M2}$ is minimized. The second-motor rotational speed $N_{M2}$ may be decreased by directly controlling the second motor M2. Alternatively, the second-motor rotational speed $N_{M2}$ may be decreased by increasing the first-motor rotational speed $N_{M1}$.

Subsequently, in step SA8 that corresponds to the first torque control means 84, the instruction for gradually increasing the engagement pressure for the first clutch C1 or the second clutch C2 that should be engaged, instead of quickly applying the engagement pressure to the clutch C1 or the second clutch C2, is output to the hydraulic control circuit 70 so that the torque $T_{OUT}$ output from the automatic shift portion 20 is gradually increased, and a shock is suppressed.

In FIG. 13, before time point $t_1$, the first motor M1 and the second motor M2 are in the no-load state such that the first motor M1 and the second motor M2 are idling while the vehicle is stopped, and the engine 8 is idling. At time point $t_1$, the shift lever 52 is moved from the position N to the position D (R) while the vehicle is stopped, and the engine 8 is idling. Before time point $t_2$, the control of the engagement pressure for the first clutch C1 is not executed. During the period from time point $t_1$ to time point $t_2$, although the complete synchronization control using the first motor M1 and the second motor M2 is not executed, the second-motor rotational speed $N_{M2}$ (the transmitting-member rotational speed $N_{18}$) is minimized toward zero that is a synchronous rotational speed. Thus, a decrease in the durability of the first clutch C1 is suppressed. Then, during the period from time point $t_2$ to time point $t_3$, the engagement pressure control is executed to gradually increase the engagement pressure for the first clutch C1, instead of quickly applying the engagement pressure to the first clutch C1. As a result, the second-motor rotational speed $N_{M2}$ is reduced to zero. If the torque input to the first clutch C1 is changed while the engagement pressure control is being executed during the period from time point $t_2$ to time point $t_3$, it is difficult to execute the engagement pressure control. Therefore, the reaction torque borne by the first motor M1 is maintained as constant as possible. Also, because the output torque $T_{OUT}$ needs to be quickly increased simultaneously with completion of the engagement of the first clutch C1, the first motor M1 starts to bear the reaction torque before the completion of the engagement of the first clutch C1. That is, if the output torque $T_{OUT}$ is increased slowly after the shift lever 52 is moved from the position N to the position D (R), the driver may feel uncomfortable. Therefore, the first motor M1 starts to bear the reaction torque before the completion of the engagement of the first clutch C1, to prevent the driver from feeling uncomfortable.

When the engine 8 is not operating, and the vehicle speed V is zero, the synchronization control, which is executed in step SA4, does not need to be executed. Therefore, when a negative determination is made in step SA2, the control is executed to quickly apply the engagement pressure to the first clutch C1 or the second clutch C2 that should be engaged according to the movement of the shift lever 52 from the position N (P) to the position D (R), in step SA9 that corresponds to the stepped shift control means 82. Thus, the members from the output member of the differential portion 11 to the driving wheels 34 are mechanically connected to each other. That is, the power transmission path in the shift mechanism 10 is switched to the power-transmission permitted state.

Subsequently, in step SA10 that corresponds to the hybrid control means 86, the output torque $T_{OUT}$ is increased at the time of start of the vehicle by increasing the torque of the second motor M2 so that the vehicle is driven in the motor-driven mode according to the amount of output required by the driver, such as the accelerator-pedal operation amount, while the first motor M1 is idling, and the engine speed $N_E$ is maintained at zero or substantially zero as required using the differential action of the differential portion 11.

In FIG. 14, before time point $t_1$, the first motor M1 and the second motor M2 are in the no-load state, and both of the rotational speed of the first motor M1 and the rotational speed of the second motor M2 are zero while the vehicle is stopped, and the engine 8 is stopped. At time point $t_1$, the shift lever 52 is moved from the position N to the position D (R) while the vehicle is stopped and the engine 8 is stopped. Because the vehicle speed V is zero, the rotational speeds of the members to be connected by the first clutch C1 or the second clutch C2 are synchronous. Therefore, if the shift lever 52 is moved from the position N to the position D at time point $t_1$, the control is executed to quickly apply the engagement pressure to the first clutch C1 during the period from time point $t_2$ to time point $t_3$. After time point $t_3$, the output torque $T_{OUT}$ is increased by increasing the torque of the second motor M2 so that the vehicle is driven in the motor-driven mode. When the vehicle is driven in the motor-driven mode, the first motor M1 is idling and the first-motor rotational speed $N_{M1}$ is a negative value so that the engine speed $N_E$ is maintained at zero or substantially zero using the differential action of the differential portion 11. As shown in FIG. 14, in the case indicated by the two dot chain line where the accelerator pedal is quickly depressed, the output torque $T_{OUT}$ is increased quickly, as compared to the case indicated by the solid line.

Figure 15:
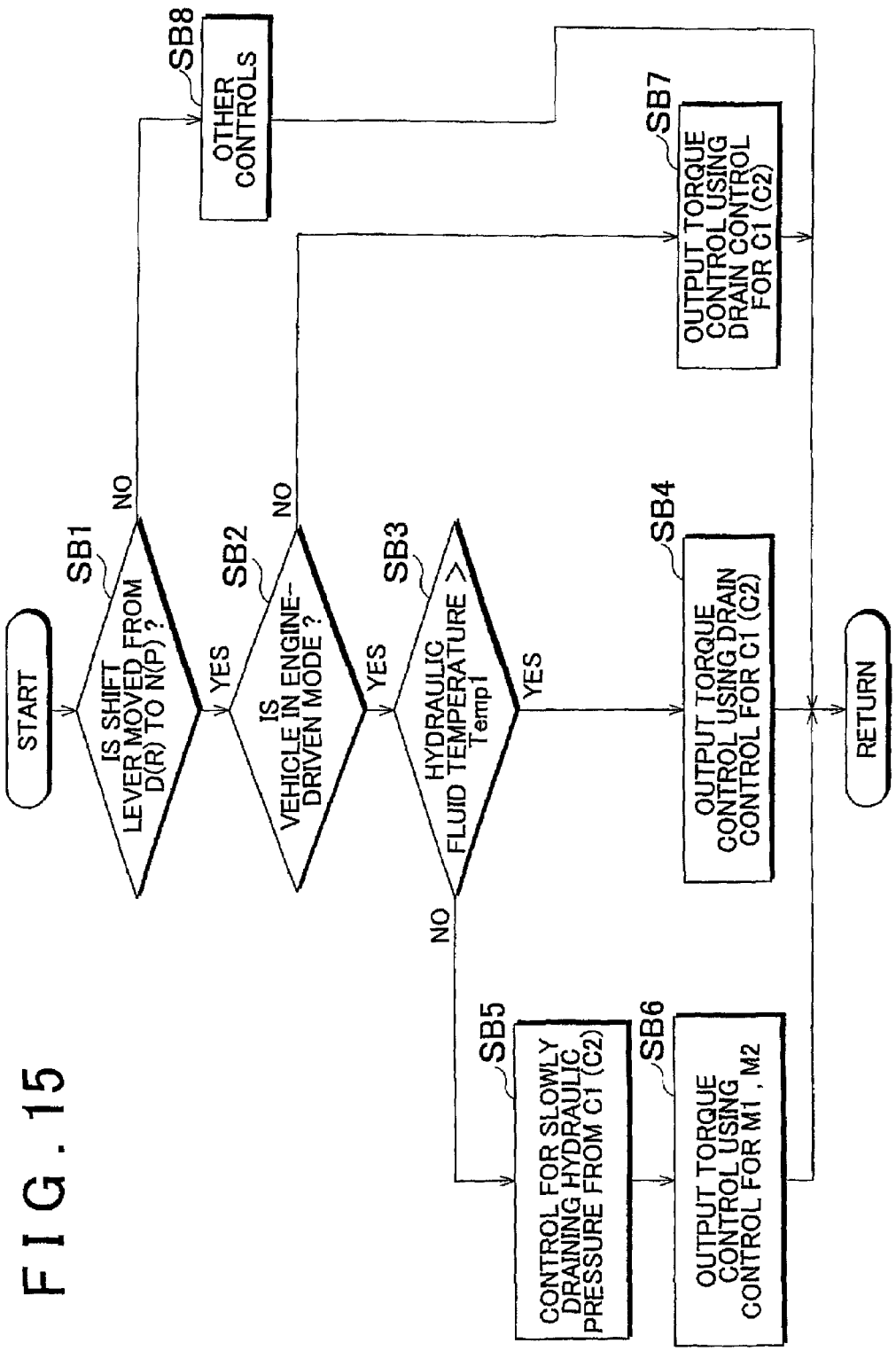
FIG. 15 is a flowchart explaining the control operation performed by the electronic control unit in FIG. 4, that is, the control operation for appropriately controlling the torque output from the automatic shift portion when the shift lever is moved from the position D (R) to the position N (P), FIG. 15 corresponding to FIG. 10.

FIG. 15 is a flowchart explaining the main control operation performed by the electronic control unit 80, that is, the control operation for appropriately controlling the torque $T_{OUT}$ output from the automatic shift portion 20 when the shift lever 52 is moved from the position D (R) to the position N (P). This routine is executed in an extremely short cycle of, for example, several msec to several tens of msec, and the routine is repeatedly executed.

Figure 16:
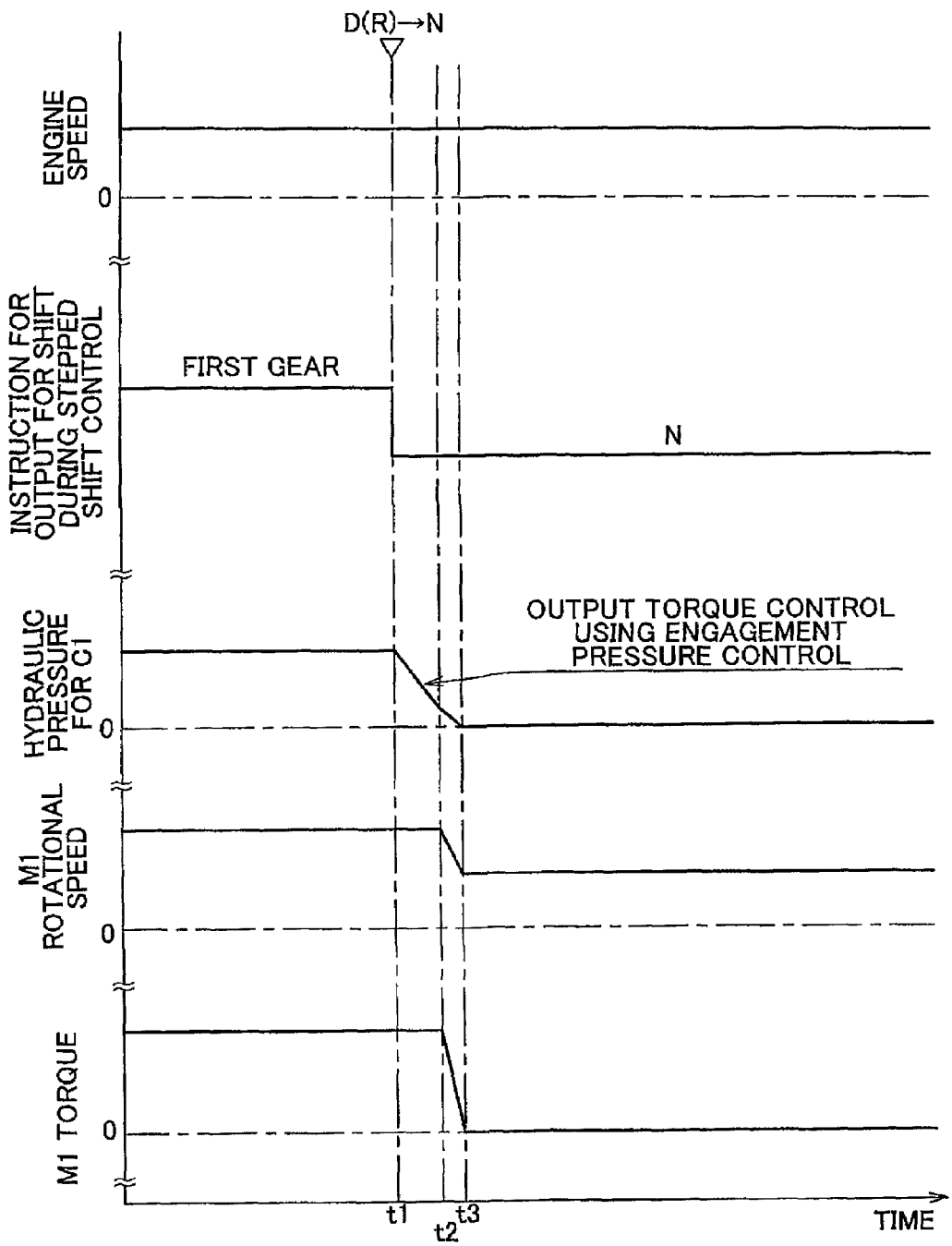
FIG. 16 is a time chart that explains the control operation shown in the flowchart in FIG. 15, and that shows the case where a hydraulic fluid temperature is appropriate when the shift lever is moved from the position D (R) to the position N while the vehicle is in the engine-driven mode.
Figure 17:
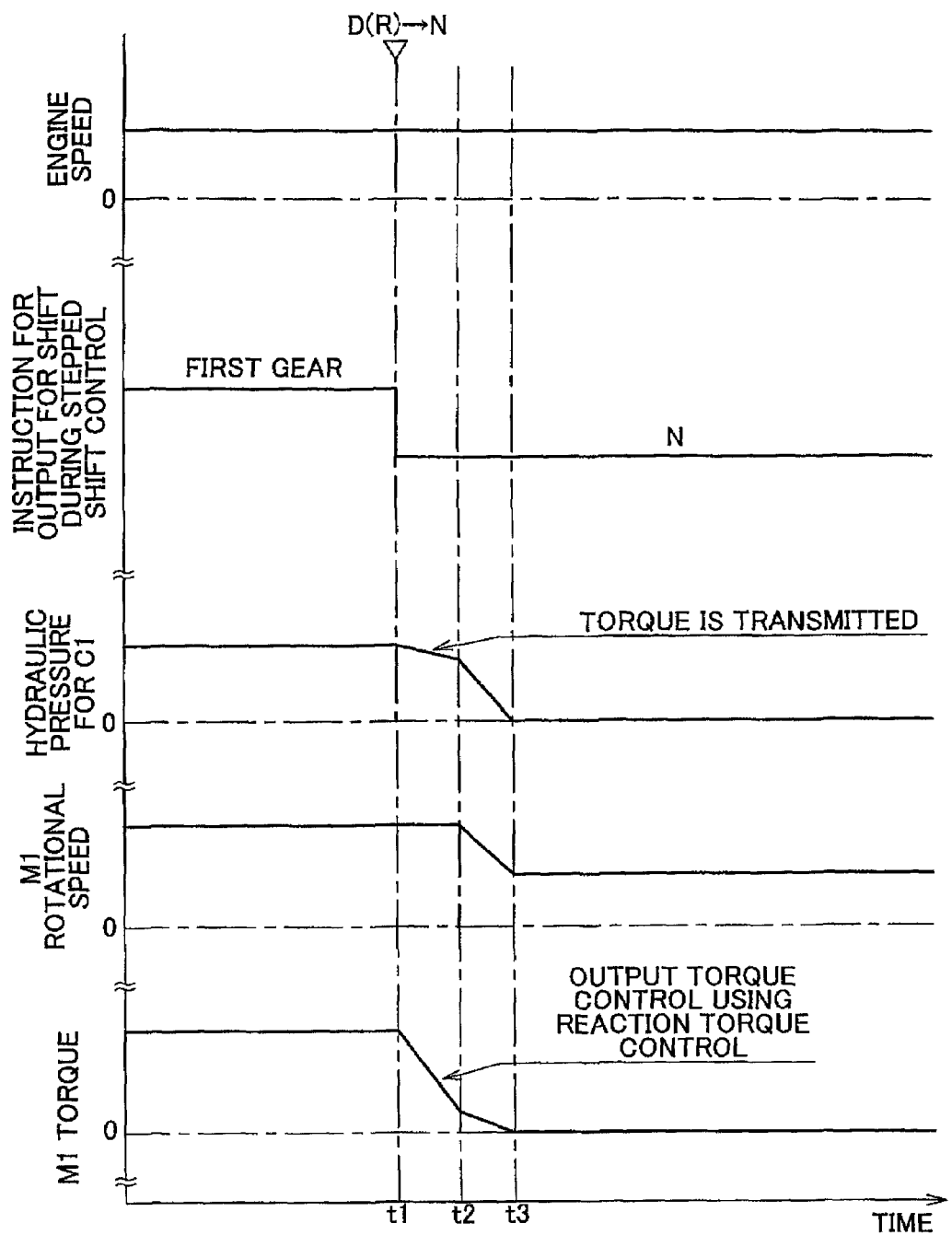
FIG. 17 is a time chart that explains the control operation shown in the flowchart in FIG. 15, and that shows the case where the hydraulic fluid temperature is extremely low when the shift lever is moved from the position D (R) to the position N while the vehicle is in the engine-driven mode.

FIGS. 16 and 17 are time charts explaining the control operation shown in the flowchart in FIG. 15. FIG. 16 shows the case where the hydraulic fluid temperature is appropriate when the shift lever 52 is moved from the position D (R) to the position N while the vehicle is in the engine-driven mode. FIG. 17 shows the case where the hydraulic fluid temperature is extremely low when the shift lever 52 is moved from the position D (R) to the position N while the vehicle is in the engine-driven mode.

In FIG. 15, first, in step SB1 that corresponds to the shift operation determination means 92, it is determined whether the shift lever 52 is moved from the position D (R) to the position N (P), based on the shift position $P_{SH}$.

When a negative determination is made in step SB1, controls other than the control of the torque $T_{OUT}$ output from the automatic shift portion 20 are executed in step SB8, or the routine is finished.

When an affirmative determination is made in step SB1, it is determined whether the engine 8 is operating, that is, the vehicle is in the engine-driven mode, based on the instruction output to the engine output control device 58 (for example, the signal indicating the amount of fuel to be supplied), in step SB2 that corresponds to the engine-driven determination means 94.

When an affirmative determination is made in step SB2, it is determined whether the hydraulic fluid temperature $T_{OIL}$ is higher than the predetermined temperature Temp1 in step SB3 that corresponds to the hydraulic fluid temperature determination means 98 and the torque control selection means 90.

When it is determined that the hydraulic fluid temperature $T_{OIL}$ is higher than the predetermined temperature Temp1, the first torque control means 84 is selected to control the output torque $T_{OUT}$. When it is determined that the hydraulic fluid temperature $T_{OIL}$ is equal to or lower than the predetermined temperature Temp1, it may be difficult for the first torque control means 84 to control the engagement pressure for the first clutch C1 or the second clutch C2 due to the high viscosity of the hydraulic oil. Therefore, a problem may occur, for example, a shock may be increased. Thus, the second torque control means 88 is selected to control the output torque $T_{OUT}$.

When an affirmative determination is made in step SB3, the instruction for gradually decreasing the engagement pressure for the first clutch C1 or the second clutch C2 that should be disengaged, instead of quickly draining the engagement pressure from the first clutch C1 or the second clutch C2, is output to the hydraulic control circuit 70 so that the torque $T_{OUT}$ output from the automatic shift portion 20 is gradually decreased, and a shock is suppressed, in step SB4 that corresponds to the first torque control means 84.

In FIG. 16, at time point $t_1$, the shift lever 52 is moved from the position D (R) to the position N while the hydraulic fluid temperature $T_{OIL}$ is higher than the predetermined temperature Temp1, and the engine 8 is idling. During the period from time point $t_1$ to time point $t_2$, the engagement pressure control is executed to gradually decrease the engagement pressure for the first clutch C1, instead of quickly draining the engagement pressure from the first clutch C1. This engagement pressure control is executed in the same manner as the manner in which the well-known engagement pressure control is executed when the clutch-to-clutch shift is performed considering a shift shock and shift responsiveness. After time point $t_2$, the first clutch C1 is substantially disengaged, and the output torque $T_{OUT}$ is substantially zero. During the period from time point $t_2$ to time point $t_3$, the control of the reaction torque corresponding to the engine torque $T_E$ using the first motor M1 is quickly finished. In this case, because the hydraulic fluid temperature is appropriate, there is no problem regarding the controllability of the control of the output torque using the engagement pressure control. Thus, the output torque $T_{OUT}$ is appropriately controlled using the engagement pressure control.

While the second torque control means 88 is controlling the output torque $T_{OUT}$, the torque is transmitted via the first clutch C1 or the second clutch C2 that should be disengaged. Therefore, when a negative determination is made in step SB3, the instruction for slowly (gradually) draining the engagement pressure from the first clutch C1 or the second clutch C2 that should be disengaged is output to the hydraulic control circuit 70 so that the second torque control means 88 can execute the control of the output torque $T_{OUT}$, in step SB5 that corresponds to the stepped shift control means 82.

Subsequently, in step SB6 that corresponds to the second torque control means 88, while the power transmission path in the shift mechanism 10 is maintained in the power-transmission permitted state, the reaction torque borne by the first motor M1 is gradually decreased so that the torque $T_{OUT}$ output from the automatic shift portion 20 is gradually decreased, and a shock is suppressed. Thus, the output torque $T_{OUT}$ transmitted to the driving wheels 34 is controlled. When the assist torque is output from the second motor M2, the torque of the second motor M2 is also gradually decreased. This avoids a sharp decrease in the output torque $T_{OUT}$ transmitted to the driving wheels 34.

In FIG. 17, at time point $t_1$, the shift lever 52 is moved from the position D (R) to the position N while the hydraulic fluid temperature $T_{OIL}$ is equal to or lower than the predetermined temperature Temp1, and the engine 8 is idling. During the period from time point $t_1$ to time point $t_2$, the reaction torque borne by the first motor M1 is gradually decreased while the torque is transmitted via the first clutch C1 by slowly (gradually) draining the engagement pressure from the first clutch C1. Thus, the output torque $T_{OUT}$ transmitted to the driving wheels 34 is controlled. After time point $t_2$, the output torque $T_{OUT}$ is made substantially zero due to the decrease in the reaction torque borne by the first motor M1. During the period from time point $t_2$ to time point $t_3$, the engagement pressure for the first clutch C1 is decreased more quickly than during the period from time point $t_1$ to time point $t_2$. In this case, although the hydraulic fluid temperature is low, because the output torque $T_{OUT}$ is controlled without depending on the engagement pressure control, there is no problem regarding the controllability of the control of the output torque $T_{OUT}$. Thus, the output torque $T_{OUT}$ is appropriately controlled by controlling the reaction torque borne by the first motor M1.

When a negative determination is made in step SB2, the instruction for decreasing the engagement pressure for the first clutch C1 or the second clutch C2 that should be disengaged as long as a shock is not increased, is output to the hydraulic control circuit 70, in step SB7 that corresponds to the stepped shift control means 82.

As described above, in the embodiment, the control selection means 90 selects the first torque control means 84 or the second torque control means 88, as the control means for controlling the torque $T_{OUT}$ output from the automatic shift portion 20, based on the vehicle condition. The first torque control means 84 controls the output torque $T_{OUT}$ by controlling the engagement pressure for the first clutch C1 or the second clutch C2. The second torque control means 88 controls the output torque $T_{OUT}$ by controlling the reaction torque borne by the first motor M1 while the power transmission path in the shift mechanism 10 is in the power-transmission permitted state. Thus, the output torque $T_{OUT}$ is appropriately controlled, regardless of the vehicle condition.

Also, in the embodiment, when the hydraulic fluid temperature determination means 98 determines that the hydraulic fluid temperature $T_{OIL}$ is equal to or lower than the predetermined temperature Temp1, the torque control selection means 90 selects the second torque control means 88. Therefore, when the vehicle is in the condition that the hydraulic fluid temperature $T_{OIL}$ is extremely low, that is, the hydraulic fluid temperature $T_{OIL}$ is equal to or lower than the predetermined temperature Temp1, and it may be difficult for the first torque control means 84 to accurately control the engagement pressure for the first clutch C1 or the second clutch C2 due to the high viscosity of the hydraulic fluid, the torque control selection means 90 selects the second torque control means 88. Thus, the output torque $T_{OUT}$ is appropriately controlled.

Also, in the embodiment, when the shift operation determination means 92 determines that the shift lever 52 is moved from the position N (P) to the position D (R), or from the position D (R) to the position N (P), the torque control selection means 90 selects the first torque control means 84 or the second torque control means 88. Therefore, when the shift lever 52 of the shift operation device 50 is moved between the drive position and the non-drive position, the output torque $T_{OUT}$ is appropriately controlled, and a shock is suppressed.

Also, in the embodiment, when the shift operation determination means 92 determines that the shift lever 52 is moved from the position N (P) to the position D (R), and the synchronization control determination means 96 determines that the hybrid control means 86 cannot execute the synchronization control that minimizes the difference in the rotational speed between the members to be connected by the first clutch C1 or the second clutch C2, the torque control selection means 90 selects the first torque control means 84. Accordingly, when the vehicle is in the condition that the synchronization control using the motor M1 and M2 cannot be executed, for example, due to a decrease in the state of charge (SOC) of the electric power storage device 56, and therefore, the first clutch C1 or the second clutch C2 needs to be engaged while the members to be connected by the first clutch C1 or the second clutch C2 are in the asynchronous state, the first torque control means 84 is selected. Thus, the engagement pressure for the first clutch C1 or the second clutch C2 is accurately controlled, and the output torque $T_{OUT}$ is appropriately controlled.

Also, in the embodiment, when the shift operation determination means 92 determines that the shift lever 52 is moved from the position N (P) to the position D (R), and the synchronization control determination means 96 determines that the hybrid control means 86 can execute the synchronization control that minimizes the difference in the rotational speed between the members to be connected by the first clutch C1 or the second clutch C2, the torque control selection means 90 selects the second torque control means 88. Thus, when the hybrid control means 86 has reduced the difference in the rotational speed between the members to be connected by the first clutch C1 or the second clutch C2, the stepped shift control means 82 engages the first clutch C1 or the second clutch C2 to switch the state of the power transmission path to the power-transmission permitted state. Then, the second torque control means 88 gradually increases the reaction torque borne by the first motor M1. Thus, the output torque $T_{OUT}$ is controlled. Accordingly, when the first clutch C1 or the second clutch C2 is quickly engaged to switch the state of the power transmission path from the power-transmission interrupted state to the power-transmission permitted state, an engagement shock is suppressed. In addition, the increase in the output torque $T_{OUT}$ is controlled by controlling the reaction torque borne by the first motor M1 after the first clutch C1 or the second clutch C2 is engaged. As a result, the output torque $T_{OUT}$ is appropriately controlled.

Next, another embodiment of the invention will be described. In the following description, the same or corresponding portions as in the above-described embodiment are denoted by the same reference numerals.

ii. Second Embodiment

Figure 20:
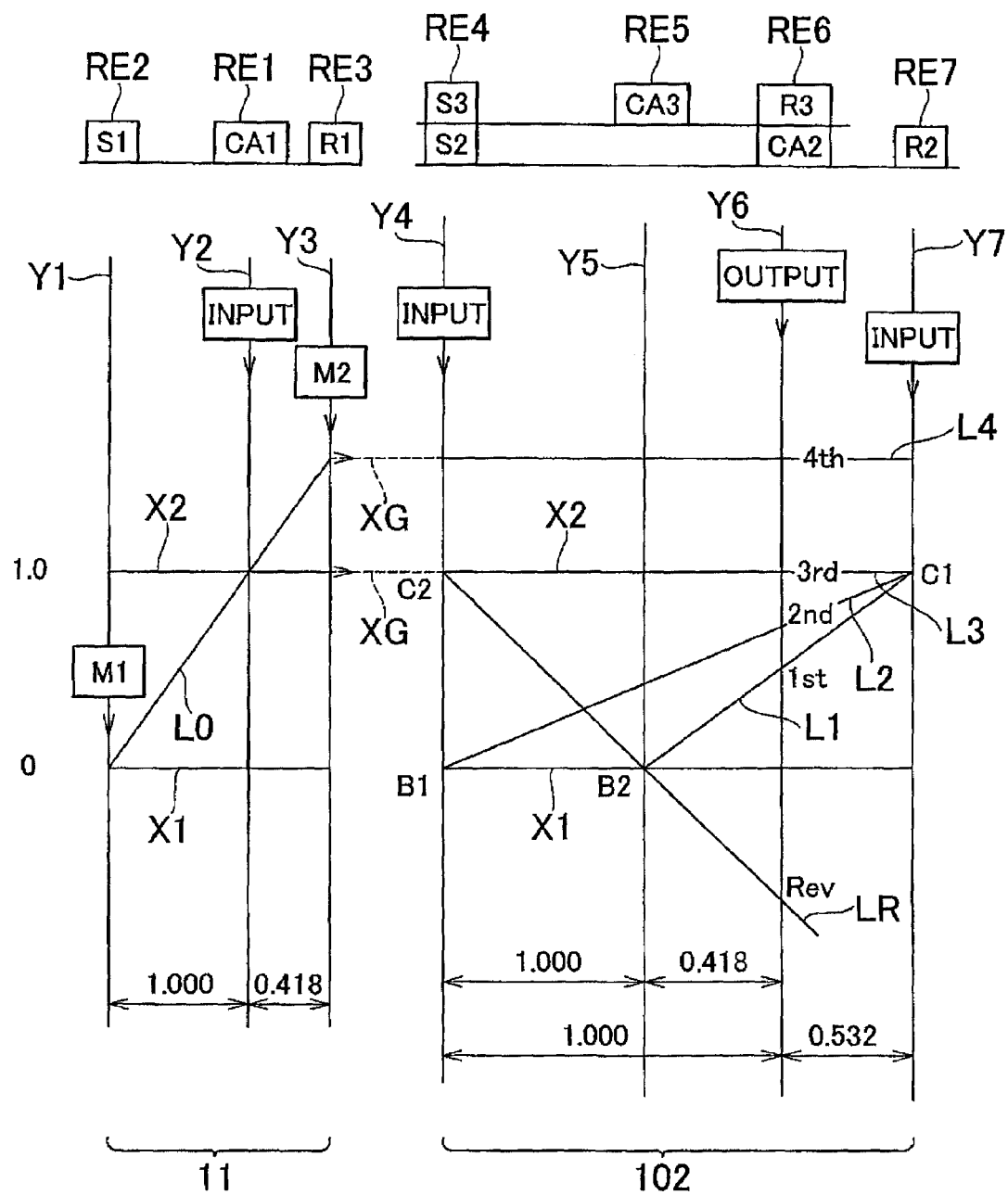
FIG. 20 is a collinear diagram explaining the relative rotational speeds at each gear in the drive apparatus in FIG. 18, FIG. 20 corresponding to FIG. 3.

FIG. 18 is a schematic diagram explaining the configuration of a shift mechanism 100 according to the other embodiment of the invention. FIG. 19 is an engagement table showing the combinations of operations of the hydraulic frictional engagement devices used in the shift operation of the shift mechanism 100. FIG. 20 is a collinear diagram explaining the shift operation of the shift mechanism 100.

As in the above-described embodiment, the shift mechanism 100 includes the differential portion 11 and an automatic shift portion 102 with forward three gears. The differential portion includes the first motor M1, the power split mechanism 16, and the second motor M2. The automatic shift portion 102 is provided between the differential portion 11 and the output shaft 22, and connected to the differential portion 11 via the transmitting member 18 in series. The power split mechanism 16 includes the first planetary gear unit 24. The first planetary gear unit 24 is of a single pinion type, and has the predetermined gear ratio ρ1 of, for example, approximately "0.418". The automatic shift portion 102 includes the second planetary gear unit 26 and the third planetary gear unit 28. The second planetary gear unit 26 is of a single pinion type, and has the predetermined gear ratio ρ2 of, for example, approximately "0.532". The third planetary gear unit 28 is of a single pinion type, and has the predetermined gear ratio ρ3 of, for example, approximately "0.418". The second sun gear S2 of the second planetary gear unit 26 and the third sun gear S3 of the third planetary gear unit 28, which are integrally connected to each other, are selectively connected to the transmitting member 18 via the second clutch C2. Also, the second sun gear S2 and the third sun gear S3 are selectively connected to the case 12 via the first brake B1. The second carrier CA2 of the second planetary gear unit 26 and the third ring gear R3 of the third planetary gear unit 28, which are integrally connected to each other, are connected to the output shaft 22. The second ring gear R2 is selectively connected to the transmitting member 18 via the first clutch C1. The third carrier CA3 is selectively connected to the case 12 via the second brake B2.

Thus, the automatic shift portion 102 is selectively connected to the differential portion 11 (the transmitting member 18) via the first clutch C1 or the second clutch C2 that is used to select the gear of the automatic shift portion 102. In other words, each of the first clutch C1 and the second clutch C2 functions as the engagement device that selectively switches the state of the power transmission path between the transmitting member 18 and the automatic shift portion 102, that is, the power transmission path from the differential portion 11 (the transmitting member 18) to the drive wheels 34. The state of the power transmission path is selectively switched between the power-transmission permitted state and the power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When the disengagement-side engagement device is disengaged, and the engagement-side engagement device is engaged in the automatic shift portion 102, a clutch-to-clutch shift is performed. As a result, any one of the first gear to the third gear, or the reverse gear, or the neutral state is selected. Thus, the speed ratio γ (=the transmitting-member rotational speed $N_{18}$/the output-shaft rotational speed $N_{OUT}$) at each gear is achieved. The speed ratio γ changes substantially geometrically. For example, as shown in the engagement operation table in FIG. 19, the first gear, at which a speed ratio γ1 is set to the maximum value, for example, approximately "2.804", is selected by engaging the first clutch C1 and the second brake B2. The second gear, at which a speed ratio γ2 is set to a value smaller than the speed ratio γ1, for example, approximately "1.531", is selected by engaging the first clutch C1 and the first brake B1. The third gear, at which a speed ratio γ3 is set to a value smaller than the speed ratio γ2, for example, approximately "1.000", is selected by engaging the first clutch C1 and the second clutch C2. The reverse gear, at which a speed ratio γR is set to a value between the speed ratios γ1 and γ2, for example, approximately "2.393", is selected by engaging the second clutch C2 and the second brake B2. The neutral state "N" is selected by disengaging the first clutch C1, the second clutch C2, the first brake B1, and the second brake B2. As shown in the engagement operation table in FIG. 19, the clutches C1 and C2 are engaged at the fourth gear as well as at the third gear.

In the shift mechanism 100 that has the above-described configuration, the CVT is formed by combining the differential portion 11 that functions as the CVT with the automatic shift portion 102. When the speed ratio of the differential portion 11 is controlled to be constant, the stepped transmission is substantially formed by combining the differential portion 11 with the automatic shift portion 102.

More specifically, when the differential portion 11 functions as the CVT, and the automatic shift portion 102, which is connected to the differential portion 11 in series, functions as the stepped transmission, the rotational speed input to the automatic transmission (hereinafter, referred to as "input rotational speed for the automatic transmission 102"), that is, the rotational speed of the transmitting member 18 is continuously changed at least one gear M of the automatic shift portion 102. As a result, the speed ratio is continuously changed in a certain range at the at least one gear M. Accordingly, the total speed ratio γT of the shift mechanism 100 is continuously changed. Thus, the CVT is formed in the shift mechanism 100. The ratio of the speed ratio at a gear to a speed ratio at an adjacent higher gear (i.e., step) is shown in the section "STEP" in FIG. 19. As shown in the section "TOTAL" in FIG. 19, the ratio of the speed ratio at first gear to the speed ratio at the fourth gear is 3.977.

For example, the transmitting-member rotational speed $N_{18}$ is continuously changed at each of the first gear to the third gear, and the reverse gear of the automatic shift portion 102 shown in the engagement operation table in FIG. 19. That is, the speed ratio is continuously changed in a certain range at each of the first gear to the third gear. As a result, the speed ratio is continuously changed between the first gear and the second gear, and between the second gear and the third gear. Accordingly, the total speed ratio γT of the entire shift mechanism 100 is continuously changed.

When the speed ratio of the differential portion 11 is controlled to be constant, and the clutches C and the brakes B are selectively engaged to select any one of the first gear to the third gear, and the reverse gear, the total speed ratio γT of the entire shift mechanism 100 at each gear is achieved. The total speed ratio γT changes substantially geometrically. Accordingly, in the shift mechanism 100, the stepped transmission is substantially formed.

For example, when the speed ratio γ0 of the differential portion 11 is controlled to be fixed to "1", the total speed ratio γT of the shift mechanism 100 at each of the first gear to the third gear, and the reverse gear of the automatic shift portion 102 is achieved, as shown in the engagement operation table in FIG. 19. When the speed ratio γ0 of the differential portion 11 is fixed to a value smaller than "1", for example, approximately 0.7, at the third gear of the automatic shift portion 102, the total speed ratio γT is set to a value smaller than "1" at the third gear, for example, approximately "0.705". That is, the total speed ratio γT at the fifth gear is achieved, as shown in the engagement operation table in FIG. 19.

FIG. 20 is a collinear diagram in which straight lines indicate the relative relation among the rotational speeds of the rotational elements in the shift mechanism 100 that includes the differential portion 11 and the automatic shift portion 102. Each of the rotational elements is in the connected state or in the disconnected state at each gear.

In the automatic shift portion 102 in FIG. 20, the vertical line Y4 indicates the relative rotational speed of the second sun gear S2 and the third sun gear S3, which are connected to each other, and which are regarded as the fourth rotational element (fourth element) RE4. The vertical line Y5 indicates the relative rotational speed of the third carrier CA3 that is regarded as the fifth rotational element (fifth element) RE5. The vertical line Y6 indicates the relative rotational speed of the second carrier CA2 and the third ring gear R3, which are connected to each other, and which are regarded as the sixth rotational element (sixth element) RE6. The vertical line Y7 indicates the relative rotational speed of the second ring gear R2 that is regarded as the seventh rotational element (seventh element) RE7. In the automatic shift portion 102, the fourth rotational element RE4 is selectively connected to the transmitting member 18 via the clutch C2. Also, the fourth rotational element RE4 is selectively connected to the case 12 via the first brake B1. The fifth rotational element RE5 is selectively connected to the case 12 via the second brake B2. The sixth rotational element RE6 is connected to the output shaft 22 of the automatic shift portion 102. The seventh rotational element RE7 is selectively connected to the transmitting member 18 via the first clutch C1.

When the straight line L0 matches the horizontal line X2 in the differential portion 11, and the rotational speed that is equal to the engine speed $N_E$ is input to the seventh rotational element RE7 from the differential portion 11, the rotational speed of the output shaft 22 at the first gear is indicated by the intersection of the oblique straight line L1 and the vertical line Y6 in the automatic shift portion 102, as shown in FIG. 20. The straight line L1 is set by engaging the first clutch C1 and the second brake B2. The straight line L1 passes through the intersection of the vertical line Y7 that indicates the rotational speed of the seventh rotational element RE7 (R2), and the horizontal line X2, and the intersection of the vertical line Y5 that indicates the rotational speed of the fifth rotational element RE5 (CA3) and the horizontal line X1. The vertical line Y6 indicates the rotational speed of the sixth rotational element RE6 (CA2, R3) connected to the output shaft 22. Similarly, the rotational speed of the output shaft 22 at the second gear is indicated by the intersection of the oblique straight line L2 and the vertical line Y6. The straight line L2 is set by engaging the first clutch C1 and the first brake B1. The rotational speed of the output shaft 22 at the third gear is indicated by the intersection of the oblique straight line L3 and the vertical line Y6. The straight line L3 is set by engaging the first clutch C1 and the second clutch C2.

When the straight line L0 is set in the differential portion 11 as shown in FIG. 20, and the rotational speed that is higher than the engine speed $N_E$ is input to the seventh rotational element RE7 from the differential portion 11, the rotational speed of the output shaft 22 at the fourth gear is indicated by the intersection of the horizontal straight line L4 and the vertical line Y6. The straight line L4 is set by engaging the first clutch C1 and the second clutch C2.

In the embodiment as well, because the shift mechanism 100 includes the differential portion 11 and the automatic shift portion 102, it is possible to obtain the same effects as those obtained in the above-described embodiment.

The embodiments of the invention have been described in detail with reference to the drawings. However, the invention may be realized in other embodiments.

For example, in each of the above-described embodiment, the hydraulic control circuit 70 operates the linear solenoid valve SL in the hydraulic control circuit 70 so that the engagement pressure for the first clutch C1 or the second clutch C2 that should be engaged is gradually increased (or gradually decreased), according to the instruction for gradually increasing (or gradually decreasing) the engagement pressure, which is provided by the first torque control means 84. However, instead of the linear solenoid valve, an accumulator may be used to gradually increase (or gradually decrease) the engagement pressure.

Also, in the power split mechanism 16 in each of the above-described embodiments, the first carrier CA1 is connected to the engine 8, the first sun gear S1 is connected to the first motor M1, and the first ring gear R1 is connected to the transmitting member 18. However, the connection relation is not necessarily limited to this. Each of the engine 8, the first motor M1, and the transmitting member 18 may be connected to any of the three elements CA1, S1, and R1 of the first planetary gear unit 24.

In each of the above-described embodiments, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In each of the above-described embodiments, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be provided in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like.

In each of the above-described embodiments, each of the hydraulic frictional engagement devices, such as the first clutch C1 and the second clutch C2, may be a magnetic-particle engagement device such as a magnetic-particle clutch, an electromagnetic engagement device such as an electromagnetic clutch, or a mechanical clutch such as a mesh dog clutch. For example, when the electromagnetic clutch is employed, the hydraulic control circuit 70 is not the valve device that switches the oil passage. Instead, the hydraulic control circuit 70 may be a switching device, an electromagnetic switching device, or the like, which switches the state of an electric instruction signal circuit that provides an electric instruction signal to the electromagnetic clutch.

In each of the above-described embodiments, the engagement device that can switch the state of the power transmission path between the power-transmission permitted state and the power-transmission interrupted state is the first clutch C1 or the second clutch C2 that is used to select the gear of the automatic shift portion 20 or 102. However, a device that switches the state of the power transmission path may be provided in the power transmission path from the differential portion 11 to the automatic shift portion 20 or 102, or the power transmission path from the automatic shift portion 20 or 102 to the driving wheels 34. The invention may be also applied to this case.

In each of the above-described embodiments, the automatic shift portion 20 or 102 is provided in the power transmission path between the transmitting member 18, which is the output member of the differential portion 11 (i.e., the power split mechanism 16), and the driving wheels 34. However, other types of power transmission portions (transmissions) may be provided in the power transmission path. For example, a continuously variable transmission (CVT) that is one of automatic transmissions, an automatic transmission of a constant mesh parallel two-axes type in which a gear is automatically selected using a select cylinder and a shift cylinder, or a synchromesh manual transmission in which a gear is manually selected, may be provided. When other types of power transmission portions are provided separately from the automatic shift portion 20 or 102 in the power transmission path, the engagement device that can switch the state of the power transmission path between the power-transmission permitted state and the power-transmission interrupted state is provided in the power transmission path from the differential portion 11 to the power transmission portion, or the power transmission path from the power transmission portion to the driving wheels 34.

In each of the above-described embodiments, the automatic shift portion 20 or 102 is connected to the differential portion 11 in series via the transmitting member 18. However, the input shaft 14 may be provided in parallel with a counter shaft, and the automatic shift portion 20 or 102 may be coaxially provided on the counter shaft. In this case, the differential portion 11 is connected to the automatic shift portion 20 or 102 so that power can be transmitted, via a transmitting member set which includes a counter gear pair, a sprocket, and a chain, and which functions as the transmitting member 18.

In each of the above-described embodiments, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the second motor M2.

In each of the above-described embodiments, the power split mechanism 16 includes one planetary gear unit. However, the power split mechanism 16 may include at least two planetary gear units. When the power split mechanism 16 is in the non-differential mode (the speed-ratio fixed mode), the power split mechanism 16 may function as a transmission with at least three gears. Each of the at least two planetary gear units is not limited to the single pinion planetary gear unit, and may be a double pinion planetary gear unit.

In each of the above-described embodiments, the shift operation device 50 includes the shift lever 52 that is operated to select the shift position $P_{SH}$ among the plurality of positions. Instead of the shift lever 52, other devices may be provided. For example, a switch that can select the shift position $P_{SH}$ among the plurality of positions, such as a push-button switch or a slide switch, a device that can switch the shift position $P_{SH}$ among the plurality of positions in response to the voice of the driver, instead of manual operation, or a device that can switch the shift position $P_{SH}$ among the plurality of positions according to foot operation, may be provided. Also, in each of the above-described embodiments, by moving the shift lever 52 to the position "M", the shift ranges are set. However, the highest gear in each shift range may be set as the gear. In this case, the gear is selected, and the automatic shift portion 20 or 102 shifts to the selected gear. For example, when the shift lever 52 is manually moved to an upshift position "+" or a downshift position "−" in the position "M", one of the first gear to the fourth gear is selected in the automatic shift portion 20 according to the movement of the shift lever 52.

Thus, the embodiments of the invention that have been disclosed in the specification are to be considered in all respects as illustrative and not restrictive. Various changes and modifications may be made to the above-described embodiments, based on the knowledge of persons skilled in the art.

What is claimed is:

1. A control apparatus for a vehicular drive apparatus that includes a differential portion that includes a differential mechanism that distributes an output from an engine to a first motor and a transmitting member; a power transmission portion that is provided in a power transmission path from the differential portion to a driving wheel; and an engagement device that can switch a state of the power transmission path between a power-transmission permitted state and a power-transmission interrupted state, and a switching device whose position is selectively switched between a drive position for switching the state of the power transmission path to the power-transmission permitted state using the engagement device, and a non-drive position for switching the state of the power transmission path to the power-transmission interrupted state using the engagement device, wherein the control apparatus controls the engagement device that switches the state of the power transmission path from the power-transmission interrupted state to the power-transmission permitted state when the position of the switching device is switched from the non-drive position to the drive position; the control apparatus comprising:

a first torque control portion that controls a torque output from the power transmission portion to the driving wheel, by gradually changing an engagement pressure for the engagement device, when the position of the switching device is switched from the non-drive position to the drive position while the engine is operating;

a second torque control portion that controls the torque output from the power transmission portion to the driving wheel, by gradually changing a reaction torque borne by the first motor while the power transmission path is in the power-transmission permitted state, and the engagement device has an engagement capacity, when the position of the switching device is switched from the non-drive position to the drive position while the engine is operating;

a torque control selection portion that selects one of the first torque control portion and the second torque control portion as a control portion that controls the torque output from the power transmission portion, based on a vehicle condition, when the position of the switching device is switched form the non-drive position to the drive position while the engine is operating;

a second motor that is operatively connected to the transmitting member; and synchronization control portion that executes a control that minimizes a relative rotational speed difference in the engagement device, using the first motor and the second motor, when the position of the switching device is switched from the non-drive position to the drive position while the engine is operating; wherein the torque control selection portion selects the first torque control portion when the position of the switching device is switched from the non-drive position to the drive position, and the synchronization control portion cannot execute the control that minimizes the relative rotational speed difference.

2. The control apparatus for the vehicular drive apparatus according to claim 1, wherein the vehicle condition is a temperature of hydraulic fluid used to operate the engagement device, and the torque control selection portion selects the second torque control portion when the temperature of the hydraulic fluid is lower than a predetermined temperature.

3. The control apparatus for the vehicular drive apparatus according to claim 1, wherein:

the torque control selection portion selects the second torque control portion when the position of the switching device is switched from the non-drive position to the drive position, and the synchronization control portion can execute the control that minimizes the relative rotational speed difference; and the second torque control portion controls the torque output from the power transmission portion by controlling the reaction torque borne by the first motor, after the state of the power transmission path is switched to the power-transmission permitted state by engaging the engagement device when the synchronization control portion has minimized the relative rotational speed difference reduced the difference.

* * * * *